United States Patent
Nagasaka et al.

(10) Patent No.: US 8,996,412 B2
(45) Date of Patent: Mar. 31, 2015

(54) INFORMATION PROCESSING SYSTEM AND INFORMATION PROCESSING METHOD

(75) Inventors: Hideo Nagasaka, Kanagawa (JP); Nobuyuki Fujiwara, Kanagawa (JP); Tadaaki Kimijima, Tokyo (JP); Toshimasa Miyoshi, Kanagawa (JP); Mamoru Tokashiki, Tokyo (JP); Takashi Tominaga, Tokyo (JP); Shigeru Inoue, Tokyo (JP); Yasushi Miyajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 663 days.

(21) Appl. No.: 12/476,342

(22) Filed: Jun. 2, 2009

(65) Prior Publication Data

US 2009/0299823 A1     Dec. 3, 2009

(30) Foreign Application Priority Data

Jun. 3, 2008  (JP) ................................. 2008-146013

(51) Int. Cl.
 *G06Q 30/00* (2012.01)
 *G06Q 10/00* (2012.01)
 *G06Q 30/02* (2012.01)

(52) U.S. Cl.
 CPC ............. *G06Q 10/00* (2013.01); *G06Q 30/02* (2013.01); *G06Q 30/0201* (2013.01)
 USPC ...................................... 705/26.7; 705/14.49

(58) Field of Classification Search
 USPC ....................................................... 705/26.7
 See application file for complete search history.

(56) References Cited

U.S. PATENT DOCUMENTS

| | | | |
|---|---|---|---|
| 5,521,841 A | 5/1996 | Arman et al. | |
| 5,875,446 A | 2/1999 | Brown et al. | |
| 6,704,729 B1 | 3/2004 | Klein et al. | |
| 6,738,759 B1 | 5/2004 | Wheeler et al. | |
| 7,043,488 B1 | 5/2006 | Baer et al. | |
| 7,716,572 B2 | 5/2010 | Beauregard et al. | |
| 7,805,129 B1 * | 9/2010 | Issa et al. | 455/412.1 |
| 8,495,099 B2 | 7/2013 | Maim | |

(Continued)

FOREIGN PATENT DOCUMENTS

| | | |
|---|---|---|
| EP | 1 434 435 A1 | 6/2004 |
| EP | 1 708 200 A1 | 10/2006 |

(Continued)

OTHER PUBLICATIONS

Ito et al., SmartCourier: an annotation system for adaptive information sharing. Transactions of the Japanese Society for Artificial Intelligence. May 1, 2002;17(3):301-12.

(Continued)

*Primary Examiner* — Jacob C. Coppola
(74) *Attorney, Agent, or Firm* — Wolf, Greenfield & Sacks, P.C.

(57) ABSTRACT

An information processing system includes a terminal device and a server device. When recommending subsidiary contents, recommended contents are extracted at the server, and recommended content information is returned to the terminal device. At the terminal device, a recommendation order is set regarding the recommended contents which the recommended content information indicates, upon which the recommended contents are presented, such that recommended content extracting processing and recommendation order setting processing is dispersed among the server device and terminal device.

2 Claims, 28 Drawing Sheets

(56) References Cited

U.S. PATENT DOCUMENTS

| | | | |
|---|---|---|---|
| 2002/0101518 A1 | 8/2002 | Suda | |
| 2004/0068505 A1 | 4/2004 | Lee et al. | |
| 2004/0073924 A1 | 4/2004 | Pendakur | |
| 2005/0120371 A1 | 6/2005 | Kimura et al. | |
| 2005/0276571 A1 | 12/2005 | Miyajima et al. | |
| 2006/0008256 A1 | 1/2006 | Khedouri et al. | |
| 2006/0047678 A1 | 3/2006 | Miyazaki et al. | |
| 2006/0080178 A1 | 4/2006 | Lee | |
| 2006/0080356 A1 | 4/2006 | Burges et al. | |
| 2006/0143236 A1* | 6/2006 | Wu | 707/104.1 |
| 2006/0195480 A1 | 8/2006 | Spiegelman et al. | |
| 2006/0233063 A1* | 10/2006 | Inoue et al. | 369/30.03 |
| 2007/0156594 A1 | 7/2007 | McGucken | |
| 2007/0276821 A1* | 11/2007 | Aravamudan et al. | 707/5 |
| 2007/0297755 A1* | 12/2007 | Holt et al. | 386/52 |
| 2008/0027796 A1* | 1/2008 | Chaves | 705/14 |
| 2008/0089657 A1 | 4/2008 | Shibata et al. | |
| 2008/0091717 A1 | 4/2008 | Garbow et al. | |
| 2008/0120501 A1* | 5/2008 | Jannink et al. | 713/163 |
| 2008/0147711 A1* | 6/2008 | Spiegelman et al. | 707/102 |
| 2008/0183794 A1* | 7/2008 | Georgis et al. | 709/201 |
| 2008/0190271 A1 | 8/2008 | Taub et al. | |
| 2008/0208823 A1* | 8/2008 | Hicken | 707/3 |
| 2008/0222295 A1 | 9/2008 | Robinson et al. | |
| 2008/0235268 A1 | 9/2008 | Miyoshi et al. | |
| 2008/0235356 A1 | 9/2008 | Miyoshi et al. | |
| 2008/0257134 A1* | 10/2008 | Oppenheimer | 84/609 |
| 2008/0259745 A1 | 10/2008 | Miyajima et al. | |
| 2008/0270532 A1* | 10/2008 | Billmaier et al. | 709/203 |
| 2008/0301173 A1* | 12/2008 | Ryu et al. | 707/102 |
| 2008/0310267 A1 | 12/2008 | Hattori et al. | |
| 2009/0018915 A1* | 1/2009 | Fisse | 705/14 |
| 2009/0106261 A1* | 4/2009 | Nagasaka et al. | 707/10 |
| 2009/0119273 A1 | 5/2009 | Nagasaka et al. | |
| 2009/0150947 A1 | 6/2009 | Soderstrom | |
| 2009/0164378 A1 | 6/2009 | West et al. | |
| 2009/0187829 A1 | 7/2009 | Brownholtz et al. | |
| 2009/0204594 A1* | 8/2009 | Akkiraju et al. | 707/5 |
| 2009/0292376 A1* | 11/2009 | Kazem et al. | 700/94 |
| 2009/0292685 A1 | 11/2009 | Liu et al. | |
| 2009/0297128 A1 | 12/2009 | Nagasaka et al. | |
| 2009/0299823 A1* | 12/2009 | Nagasaka et al. | 705/10 |
| 2009/0299981 A1 | 12/2009 | Nagasaka et al. | |
| 2009/0300036 A1 | 12/2009 | Nagasaka | |
| 2010/0031366 A1* | 2/2010 | Knight et al. | 726/26 |
| 2010/0267331 A1* | 10/2010 | Ingrassia et al. | 455/3.04 |

FOREIGN PATENT DOCUMENTS

| | | | | |
|---|---|---|---|---|
| EP | 1818930 A1 * | 8/2007 | | G11B 27/031 |
| EP | 1 959 427 A1 | 8/2008 | | |
| EP | 1 973 304 A1 | 9/2008 | | |
| GB | 2 455 392 A | 6/2009 | | |
| JP | 2000-113066 A | 4/2000 | | |
| JP | 2000-349725 A | 12/2000 | | |
| JP | 2002-109102 A | 4/2002 | | |
| JP | 2003-250136 A | 9/2003 | | |
| JP | 2004-072502 A | 3/2004 | | |
| JP | 2004-206679 A | 7/2004 | | |
| JP | 2004-264898 A | 9/2004 | | |
| JP | 2004-355070 A | 12/2004 | | |
| JP | 2005-339732 A | 12/2005 | | |
| JP | 2006-050469 A | 2/2006 | | |
| JP | 2006-518888 A | 8/2006 | | |
| JP | 2006-313537 A | 11/2006 | | |
| JP | 2007-172523 A | 7/2007 | | |
| WO | WO 2007/066813 A1 | 6/2007 | | |
| WO | WO 2008/008563 A2 | 1/2008 | | |
| WO | WO 2008/137289 A2 | 11/2008 | | |
| WO | WO 2009/006054 A2 | 1/2009 | | |

OTHER PUBLICATIONS

Miura et al., Web contents evolution based on the behavior of visitors. Technical Report of IEICE, The Institute of Electronics Information Communication Engineers. Mar. 21, 2001;100(713):23-8.

[No Author Listed], Mixmatcher help. Mixmatcher.com. Retrieved Jul. 24, 2006 from http://web.archive.org//web/20041013054115/http://www.mixmatcher.com/help.asp. Oct. 13, 2004. 2 pages. XP002391688.

[No Author Listed], Siren systems—soundflavor engine. Siren Systems, Inc. Retrieved Jul. 24, 2006 from http://web.archive.org/web/2041024002734/http://www.sirensystems.com/sf-engine-2.html. Oct. 24, 2004. 1 page. XP002391687.

Gyongyi et al., Web Spam Taxonomy http://www.itleadership.org/sites/www.itleadership.org/files/gyongyi.pdf published 2005.

Wikipedia Online Definition, "MASHUPS (music)", Jul. 9, 2011, http://en.wikipedia.org/wiki/Mashup_(music), p. 1.

Yamamoto et al., A video annotation system based on community activities. Transactions of the Information Processing Society of Japan. Dec. 2007;48(12):3624-3636.

Yasukawa et al., A personal archiving system for collection and reuse of web contents. Transaction of the Information Processing Society of Japan. Jan. 24, 2003;2003(5):139-46.

* cited by examiner

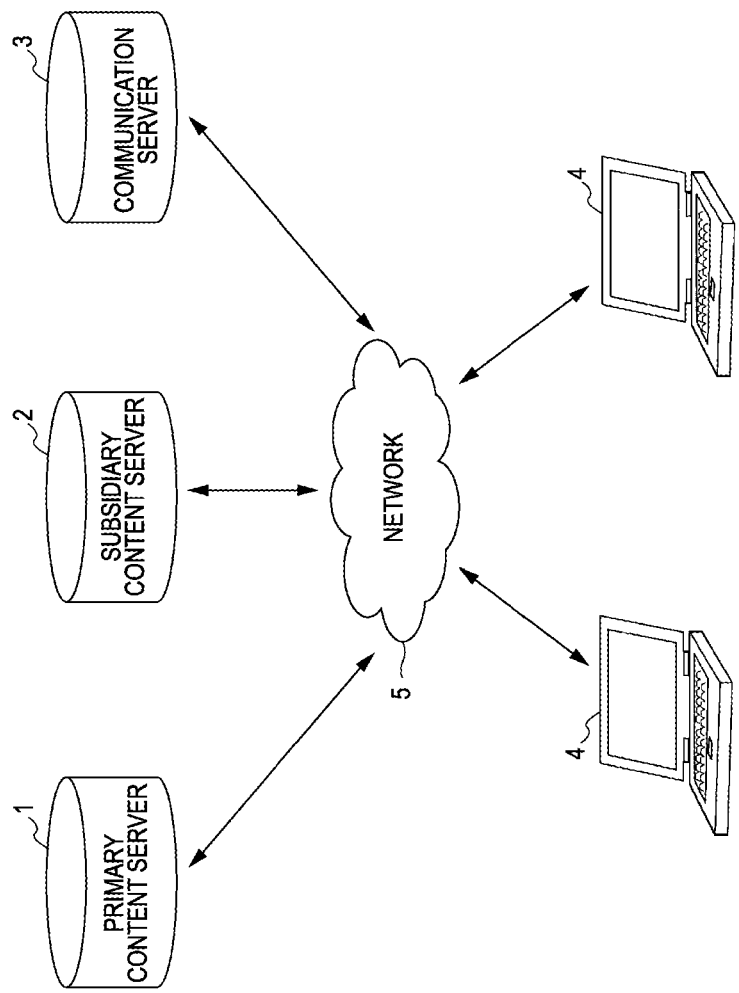

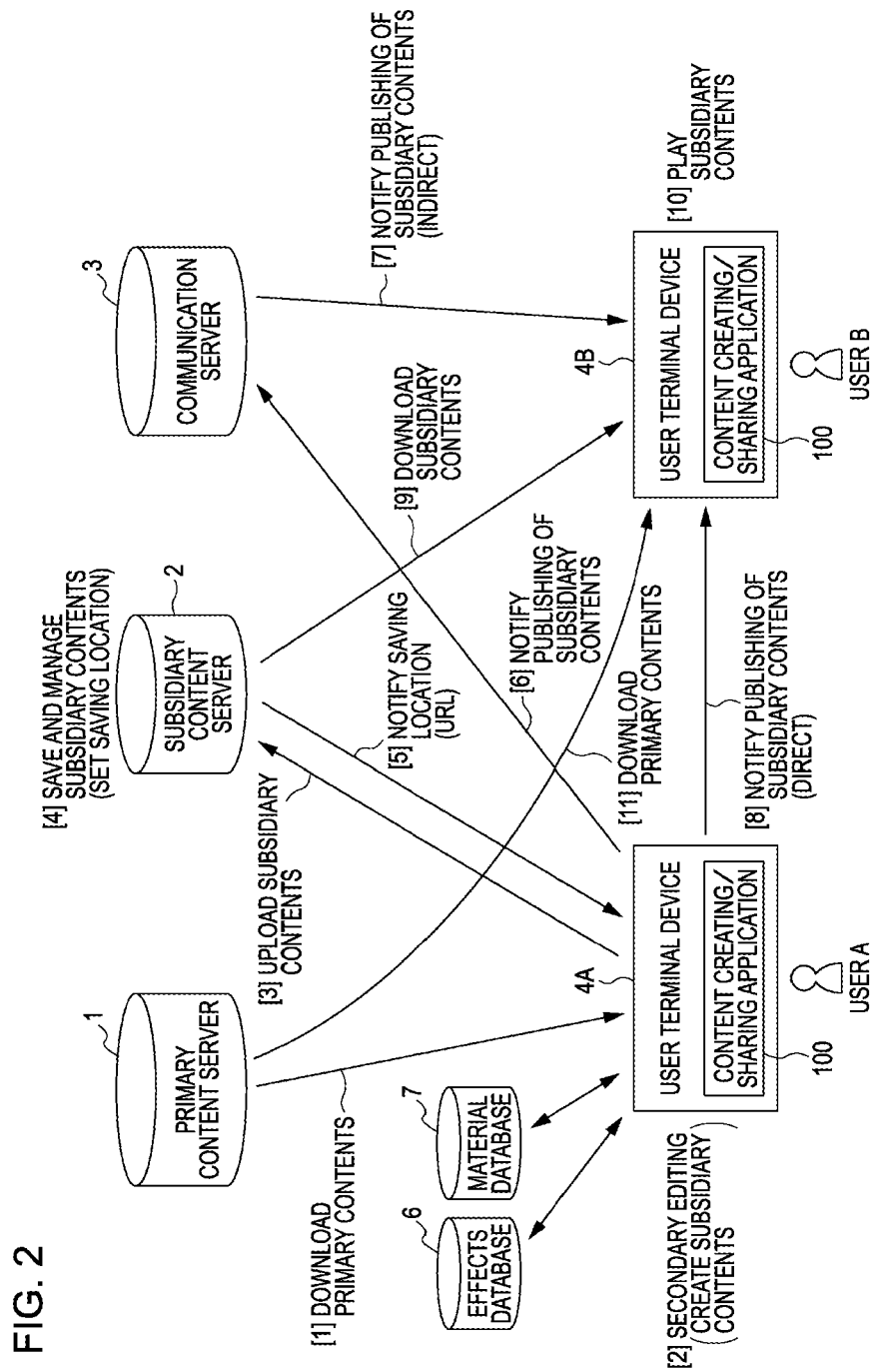

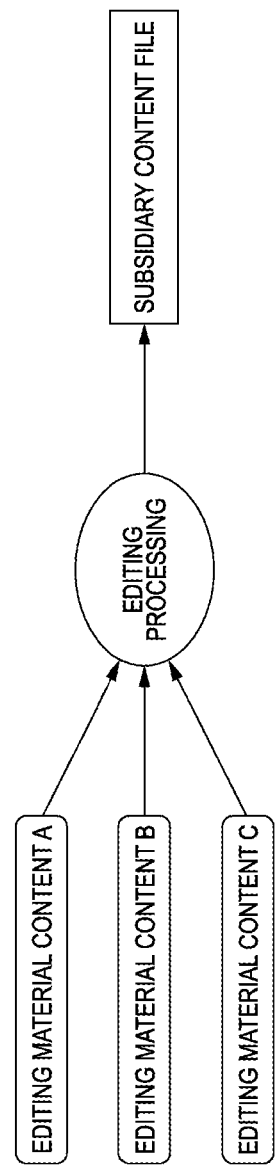

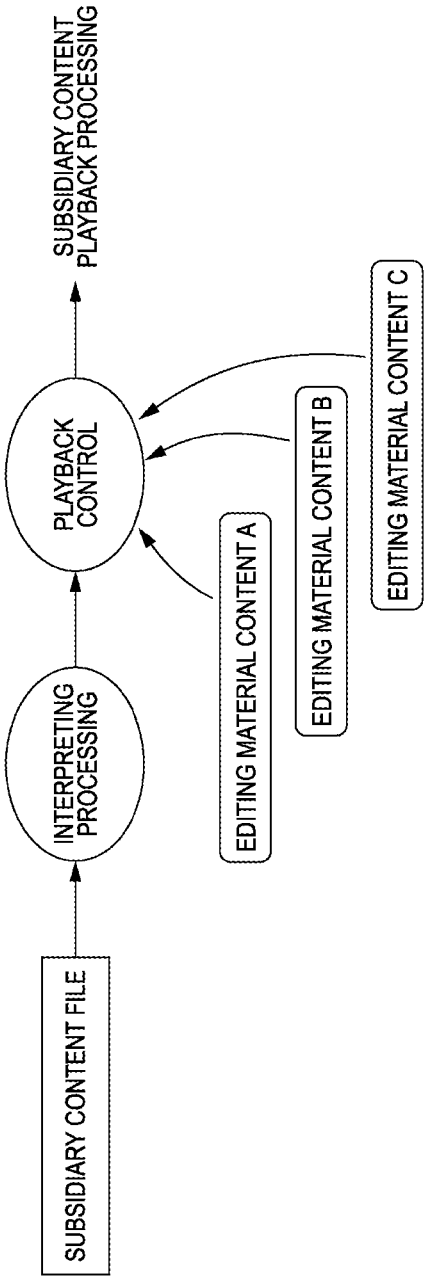

FIG. 15

| | | | |
|---|---|---|---|
| UNIT FILE INFORMATION | CONTENT ID | | AAAAAA |
| | CREATOR | | – – – – |
| | TITLE | | – – – – |
| | GENERATION | | (1 TO N) |
| | USAGE AGREEMENT RANGE INFORMATION | USAGE ITEM 1 | PERMITTED |
| | | USAGE ITEM 2 | NOT PERMITTED |
| | | ⋮ | ⋮ |
| | | USAGE ITEM n | PERMITTED |
| UNIT FILE INFORMATION | CONTENT ID | | BBBBBB |
| | CREATOR | | – – – – |
| | TITLE | | – – – – |
| | GENERATION | | (1 TO N) |
| | USAGE AGREEMENT RANGE INFORMATION | USAGE ITEM 1 | PERMITTED |
| | | USAGE ITEM 2 | USAGE PERMITTED FOR ONE GENERATION ONLY |
| | | ⋮ | ⋮ |
| | | USAGE ITEM n | NOT PERMITTED |
| UNIT FILE INFORMATION | CONTENT ID | | CCCCCC |
| | CREATOR | | – – – – |
| | TITLE | | – – – – |
| | GENERATION | | (1 TO N) |
| | USAGE AGREEMENT RANGE INFORMATION | USAGE ITEM 1 | NOT PERMITTED |
| | | USAGE ITEM 2 | PERMITTED |
| | | ⋮ | ⋮ |
| | | USAGE ITEM n | PERMITTED |

FIG. 16

[
file_id = AAAAAA
time = 00:00 − 00:10
position = vv − zz
]
[
file_id = AAAAAA
time = 00:10 − 00:15
position = ss − tt
]
[
file_id = BBBBBB
time = 00:15 − 00:20
position = pp − uu
]
.
.
.

A ALL SUBSIDIARY CONTENTS STORED IN THE SUBSIDIARY CONTENT SERVER
B SUBSIDIARY CONTENTS INCLUDING KEY PRIMARY CONTENTS IN USED SOURCE EDITING MATERIALS

FIG. 28

| KEYWORD | POINT |
|---|---|
| keyword 1 | 5 |
| keyword 2 | 8 |
| keyword 3 | 2 |
| keyword 4 | 1 |
| ⋮ | ⋮ |
| keyword X | 15 |

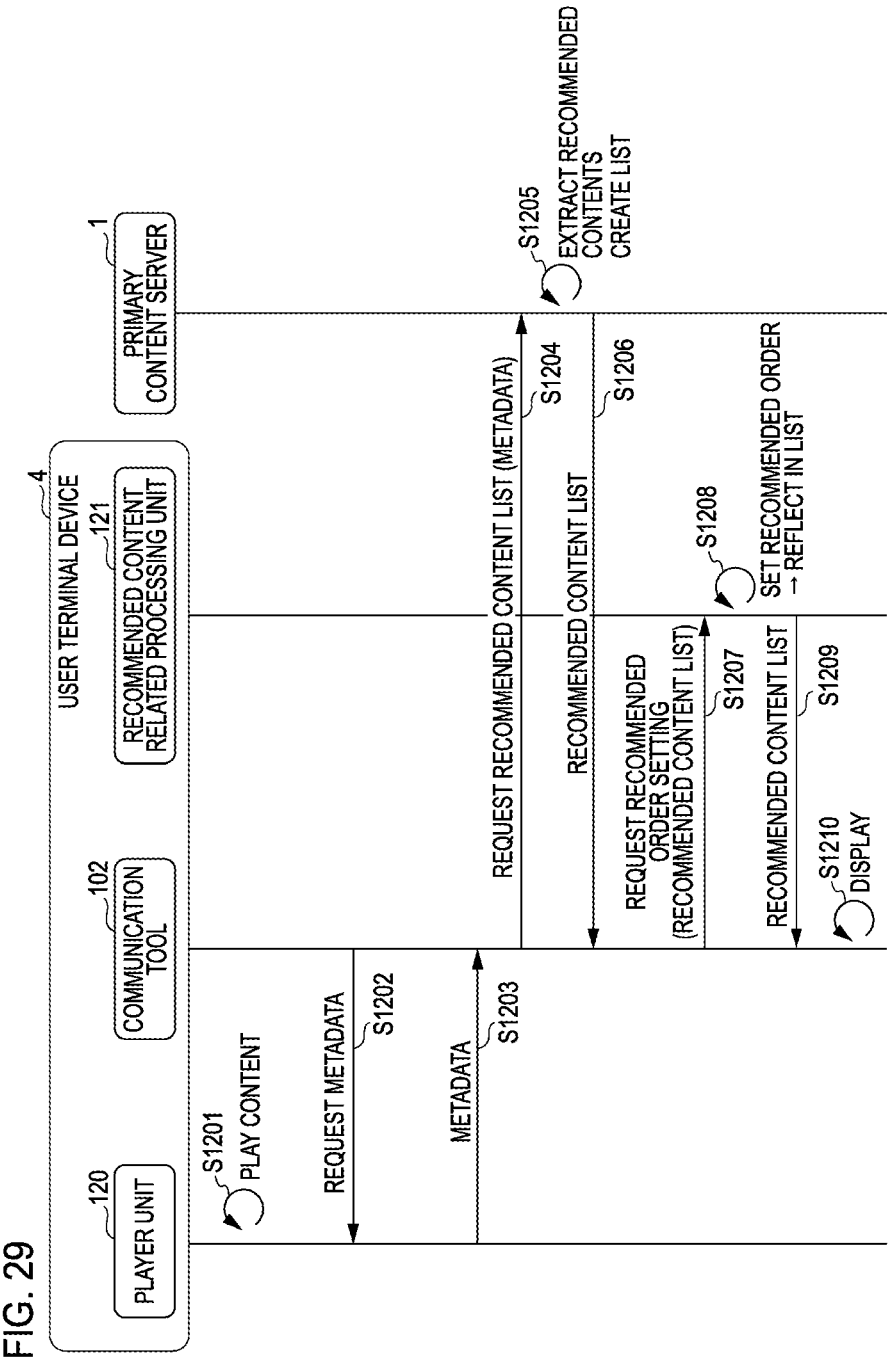

INFORMATION PROCESSING SYSTEM AND INFORMATION PROCESSING METHOD

CROSS REFERENCE TO RELATED APPLICATIONS

This application claims priority to Japanese Priority Patent Application JP 2008-146013, filed in the Japan Patent Office on Jun. 3, 2008, the entire content of which is hereby incorporated by reference.

BACKGROUND OF THE INVENTION

1. Field of the Invention

The present invention relates to, for example, an information processing system which can be used in creating contents, and sharing of data of the created contents, over a network, and to an information processing method thereof applied to the information processing system.

2. Description of the Related Art

As for one form of network usage, so-called content distribution and sharing of audio, video, and so forth, has widely come to be performed. For example, with a content distribution system, a great number of data files serving as contents to be distributed are saved and managed at a server. A user having an information processing terminal device such as a personal computer operates application software (client software) having a client function corresponding to content distribution, so as to download the desired content from the server. The data file serving as content that has been downloaded in this way is normally managed by being stored and saved in a storage device within the information processing terminal device by the client software. Subsequently, the user can listen to/view and enjoy this as sound and/or video, by performing an operation at the client software for playing the data file serving as the content stored in the information processing terminal device.

Also, with a content sharing system, a user of an information processing terminal, for example, uploads to a server data files serving as contents such as audio, video, and so forth. A server of such a sharing system has a site (Web page) for posting uploaded contents. A user of a general information processing terminal device can access this site and search for contents he/she is interested in, for example. Contents found by this searching are accessed and played, so as to be viewed/listened to, and thus are shared.

On the other hand, there is application software (editing software) capable of taking in audio data and video data and the like as material, so as to be modified, edited, and a new tune can be created, and in recent years in particular, there is widespread use thereof, from that which is easy to operate to complicated, by also common users as well.

As described above, such editing software can execute processing for changing actual data (audio/video data and so forth) serving as contents, for editing thereof. Accordingly, in the case of audio contents for example, modifying and editing or the like by taking in a part of original tune data as material, such with as so-called sampling, mash-ups, and so forth, can be easily performed. In fact, many tunes created by such techniques have been released by professional musicians or the like, for example. Description of such related art can be found in Japanese Unexamined Patent Application Publication No. 2000-113066 and Japanese Unexamined Patent Application Publication No. 2004-72502.

SUMMARY OF THE INVENTION

With a background such as described above, it can be thought that there would be a considerable number of common users who desire not only to simply play and enjoy the data of contents which can be obtained by content distribution and content sharing and so forth, but also creating new works by performing secondary editing using editing software, and publicly presenting (posting) the work.

Accordingly, to answer the demand of such general users, it has been found desirable to provide, as a content sharing system, an arrangement on a network whereby general users for example can perform secondary use of contents held at the user terminal side and perform editing to create subsidiary contents, and can publicly present contents created in this way, by way of a server or the like.

With such a content sharing system, a great number of subsidiary contents for example, will exist on the server and be shared. To make things easier for the user with the content sharing system, there is demand to enable subsidiary contents which are appropriate for recommendation to each user to be found as efficiently as possible, from these subsidiary contents.

An information processing system according to an embodiment of the present invention includes: a terminal device; and a server device; the server device further including a storing managing unit, configured to store and manage a subsidiary content which is created by editing processing secondarily using at least one content as editing material, the subsidiary content including, as information for playing the content of contents, playback control information formed including content instructing playback regarding actual content data of a primary content which is source editing material, a subsidiary content extracting unit configured to extract subsidiary contents including the primary content which the content identifier that has been received indicates in the source editing material, from subsidiary contents managed by the storing managing unit, a recommended content information transmitting unit, configured to take subsidiary contents extracted by the subsidiary content extracting unit as recommended contents, and transmit recommended content information formed of metadata corresponding to each of the recommended contents, to the terminal device; and the terminal device further including a playback unit, configured to execute playback processing regarding a held primary content which is a primary content which a recommendation-receiving user is deemed to hold, a recommended content information requesting unit, configured to transmit a recommended content information request to the server device, along with a content identifier identifying a primary content regarding which playback processing is being executed by the playback unit, a recommendation order setting unit, configured to set the recommendation order of the recommended contents indicated by the received recommended content information, by setting the recommendation order based on the usage state of the held primary content in the source editing material for each recommended content, and a presenting unit, configured to present recommended contents indicated by the recommended content information, such that the recommendation order is reflected therein.

An information processing system according to an embodiment of the present invention includes: a terminal device; and a server device; the server device further including a storing managing unit, configured to store and manage a subsidiary content which is created by editing processing secondarily using at least one content as editing material, a subsidiary content extracting unit configured to extract one or more subsidiary contents from subsidiary contents managed by the storing managing unit, with the received metadata as an extracting condition, a recommended content information transmitting unit, configured to take subsidiary contents extracted by the subsidiary content extracting unit as recommended contents, and transmit recommended content information formed of metadata of each of the recommended contents, to the terminal device; and the terminal device including a playback unit, configured to execute playback processing regarding contents, a recommended content information requesting unit, configured to transmit a recommended content information request to the server device, along with metadata added to a content regarding which playback processing is being executed by the playback unit, a recommendation order setting unit, configured to set the recommendation order of the recommended contents indicated by the received recommended content information, by setting the recommendation order based on the number of times of appearance of the content of metadata description for each recommended content included in the recommended content information, in the content of metadata description in all held contents which the recommendation-receiving user is deemed to hold, and a presenting unit, configured to present recommended contents indicated by the recommended content information, such that the recommendation order is reflected therein.

In the above configurations, the contents to be recommended are subsidiary content files. A subsidiary content file is created by secondary usage of one or more content files, and is a file of a structure having playback control information for instructing playback of actual content data which a primary content file used as source editing material includes.

At the time of recommending the subsidiary content, first, recommended contents are extracted at the server and recommended content information is returned to the terminal device. At the terminal device, a recommendation order is set regarding the recommended contents which the recommended content information indicates, and then the recommended contents are presented. That is to say, with these configurations, at the terminal device side, a recommended content relating to one content which is being played at that time is ultimately presented along with the recommendation order thereof, with processing being dispersed, in that extracting of recommended contents is performed at the server device, and setting of recommendation order is performed at the terminal device.

In this way, with the above configurations, recommended content extracting processing, and recommendation order setting processing, are performed dispersed between the server device and terminal device, so there is no great burden placed on one of the devices, and operations for presenting recommended contents along with the recommendation order can be efficiently realized as for the overall system.

Also, the starting point for extracting recommended contents is restricted to just a content being played at the terminal device, so marked reduction in burden can be achieved as compared to a configuration wherein recommended contents are extracted with the many contents which a recommendation-receiving user holds, as the object thereof.

BRIEF DESCRIPTION OF THE DRAWINGS

FIG. 1 is a diagram illustrating a configuration example of a content creating/sharing system corresponding to an embodiment of the present invention;

FIG. 2 is a diagram illustrating a basic usage form of a content creating/sharing system according to an embodiment of the present invention, and procedure examples of system operations corresponding thereto;

FIG. 3 is a diagram schematically illustrating the flow of subsidiary content creation according to the embodiment;

FIG. 4 is a diagram schematically illustrating the flow of subsidiary content playing according to the embodiment;

FIG. 15 is a diagram illustrating a structural example of used source editing material content information and used editing material content information in a subsidiary content playback control file;

FIG. 16 is a diagram illustrating an example of what is in playback control information in a subsidiary content file;

FIG. 28 is a diagram illustrating a configuration example of a user profile; and FIG. 29 is a sequence diagram illustrating an example of processing performed with the content creating/sharing system in relation to recommendation of subsidiary contents, as an extended example.

DESCRIPTION OF THE PREFERRED EMBODIMENTS

Figure 5A:
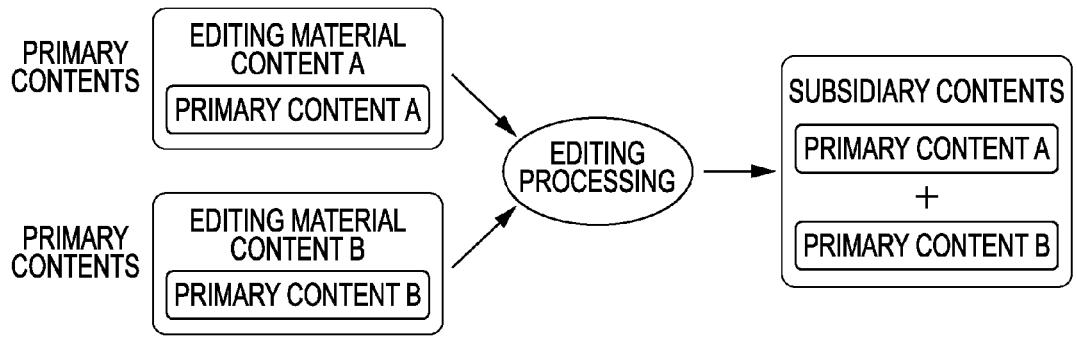
FIGS. 5A through 5C are diagrams illustrating a usage form example of editing material contents at the time of creating a subsidiary content.

FIG. 1 illustrates a configuration example of an information processing system, having information processing devices, according to an embodiment of the present invention.

Note that the information processing system according to the present embodiment handles primary content files and subsidiary content files as content files, as will be described later. In the following, content files will be referred to simply as "content files" in the event that primary content files and subsidiary content files do not have to be distinguished. Also, in the case of describing contents in accordance with abstract concepts, primary content files will also be referred to as "primary contents", and subsidiary content files will also be referred to as "subsidiary contents". Moreover, contents will be referred to simply as "contents" in the event that primary contents and subsidiary contents do not have to be distinguished.

As shown in this drawing, the information processing system according to the present embodiment can first be viewed as being formed by connecting a primary content server 1, a subsidiary content server 2, a communication server 3, and a great number of user terminal devices 4, connected by a network 5.

The information processing system according to the present embodiment realizes a content creating/sharing system by such a device configuration. That is to say, so-called content distribution (distribution of primary contents) and sharing of contents created by users (subsidiary contents) among users, on a network, are realized.

Note that "contents" as used here primarily refer to audio contents corresponding to music, songs, and the like, or video contents which is moving images. Further, the content types of video contents may be considered to include still images, such as photographs and the like. Also, document data, programs to be executed by the information processing device, and so forth, can be handled as contents.

The primary content server 1 stores and manages in a database a great number of content data, in a predetermined format, as primary contents. The primary content server 1 is configured so as to externally transmit data which is specified primary contents to the requesting user terminal devices 4, in response to download requests from the user terminal devices 4 via the network. Note that the primary contents here are, for example, videos or tunes or the like which artists and the like have created, provided from an affiliated record label.

The subsidiary content server 2 is capable of storing and managing data of a great number of subsidiary content files, which is data serving as subsidiary contents, in a database. As described later, a subsidiary content file is uploaded from a user terminal device 4 to the subsidiary content server 2 via the network. The subsidiary content server 2 stores the subsidiary content file uploaded in this way, handling as subsidiary contents. Also, a specified subsidiary content file is transmitted and output by the subsidiary content server 2 to a requesting user terminal device 4, in response to a download request from the user terminal device 4 via the network.

The communication server 3 is a server having functions for providing inter-user communication services, such as for example, SNS (Social Networking Service), services for individuals to put information out which is also widely recognized as CGM (Consumer Generated Media) such as blogs, and so forth.

A user terminal device 4 is a network device which a general user uses, and actually is a personal computer provided with network communication functions such as LAN or the like, for example. These user terminal devices 4 have installed an application program serving as a content creating/sharing application 100, as described later. The user operates this content creating/sharing application 100, and thus is enabled to perform such as downloading primary content files from the primary content server 1, creating new subsidiary content due to editing work using the downloaded primary content file (and subsidiary content file), uploading the created subsidiary content file to the subsidiary content server 2, downloading subsidiary content files from the subsidiary content server 2, using SNS services, writing/browsing blogs using the communication server 3, and so on.

Next, an example of basic operations relating to content distribution, of the information processing system according to the present embodiment assuming the configuration shown in FIG. 1 described above, will be described with reference to FIG. 2, following a basic usage form example by a user of a user terminal device 4. Note that in the description in FIG. 2, description will be made following the numbers of procedures and operations indicated by alphanumeric characters in the brackets [ ]. Also, here, user terminal devices 4A and 4B are shown as being used by two users A and B, respectively, as user terminal devices 4. In this drawing, the network 5 which exists between the primary content server 1, subsidiary content server 2, communication server 3, and user terminal devices 4 is omitted from the drawings.

Procedure 1

First, the user A accesses a content download site on the primary content server 1 with the user terminal device 4A (content creating/sharing application 100), and then searches the content download side for primary contents which the user wants to download, and performs operations for downloading the searched primary contents. In response to this operation, the user terminal device 4A transmits a download request to the primary content server 1.

Now, we will say that with the content creating/sharing system according to the present embodiment, the downloading of primary contents is basically charged for, with the user A performing proper purchasing procedures at the time of transmitting a download request to the primary content server 1. As far as purchasing procedures go, for example, this may be payment procedures for charges set individually in increments of contents or in increments of albums or the like, or may be subscriptions which have become widespread as of recent. Also, an arrangement may be conceived wherein primary contents are provided free of charge, an in this case, there are no purchasing procedures for the user A.

Upon receiving a download request as described above, the primary content server 1 first performs authentication regarding the requesting user for example, and so forth, and determines whether or not this is a legitimate download request. In the event that determination is made that this is a legitimate download, the primary contents (primary content file) specified at the time of the download request are searched for from the primary contents stored within itself, and data of the file serving as the searched primary contents is transmitted to the requesting user terminal device 4.

Note that the actual entity of the primary content file which the primary content server 1 stores while managing in a database here is of a structure wherein main information serving as actual content data has header information attached thereto. "Actual content data" in this case refers to audio data, moving image data, and still image data according to a predetermined format (data for playing the actual content of the primary contents), as what the content of the contents is. That is to say, the primary content data according to the present embodiment is that from which contents can be played by performing audio signal processing and video signal processing and so forth.

Also, header information includes, besides a unique content ID (content identifier) for each content file, various types of metadata (title, artist, title of album to which the data belongs, genre, data format, data size, etc.).

The primary content data transmitted from the primary content server 1 as described above is received at the user terminal device 4A. The user terminal device 4A (content creating/sharing application 100) stores and saves this received primary content data in a storage medium such as an internal HDD or the like. The content creating/sharing application 100 has functions for managing the primary content stored and saved in this way according to a predetermined form based on the header information for example, and executing playback control in accordance with user operations.

Thus, with this arrangement, primary content data stored in the primary content server 1 can be downloaded to user terminal devices 4, by being purchased by the user as a general principle. That is to say, for procedure 1, so-called content distribution is performed. Note that the primary content data stored and saved at the user terminal device 4A can be played by the content creating/sharing application 100, and output as images, audio, etc., with an AV (Audio-Visual) device or the like connected to the user terminal device 4A, for example.

Procedure 2

Now, generally, with content distribution via network, usage of contents following downloading is restricted to use such as playback, with a certain level of copy restrictions of data being provided. In other words, a user who has obtained contents by downloading is normally only permitted usage within a certain range, and is not provided with rights to create new contents as secondary creations by performing editing based on the obtained audio contents that have been acquired, for example.

In comparison to this, with the present embodiment, the primary content is content regarding which using as material for secondary creation within a range set beforehand (secondary usage, secondary editing) has been permitted, as a matter of principle. Note that secondary usage of the primary content in the present embodiment is set within the range of rights which the writer of the primary content has authorized.

The content creating/sharing application 100 is capable of creating audio contents as a new tune, by executing editing processing in accordance with user operations to perform secondary usage of the primary contents managed in itself (locally stored and saved) as editing material.

Also, at the time of editing such contents for example, plug-in data corresponding to predetermined special effects provided at an effect database 6 can be obtained, and editing performed using this. Also, in the same way, material such as audio, images, etc., provided at a material database 7 can be obtained, and editing performed by adding this. Note that the effect database 6 and material database 7 may be situated on a network, or may exist locally on the user terminal device 4A.

With the present embodiment, contents created in this way are called subsidiary contents, and are distinguished from primary contents. As for the procedure 2, a certain subsidiary content is created by operating operations as to the user terminal device 4A on which the content creating/sharing application 100 is running.

Note that the actual entity of the data serving as the subsidiary content created by this procedure 2 is not the digital audio data and video data having the tune content as with the primary content, but rather is generated with playback control information. That is to say, this is playback control information describing specification of effects (special effects), such as instructions of what portion of the digital audio data and digital video data serving as the secondarily used primary contents (editing material contents) is to be played and output at which timing.

Figure 5B:
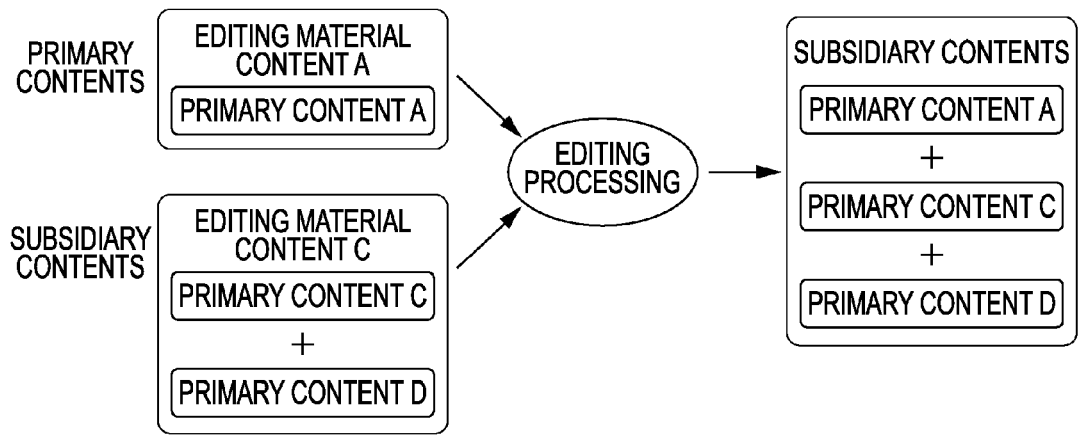
Figure 5C:
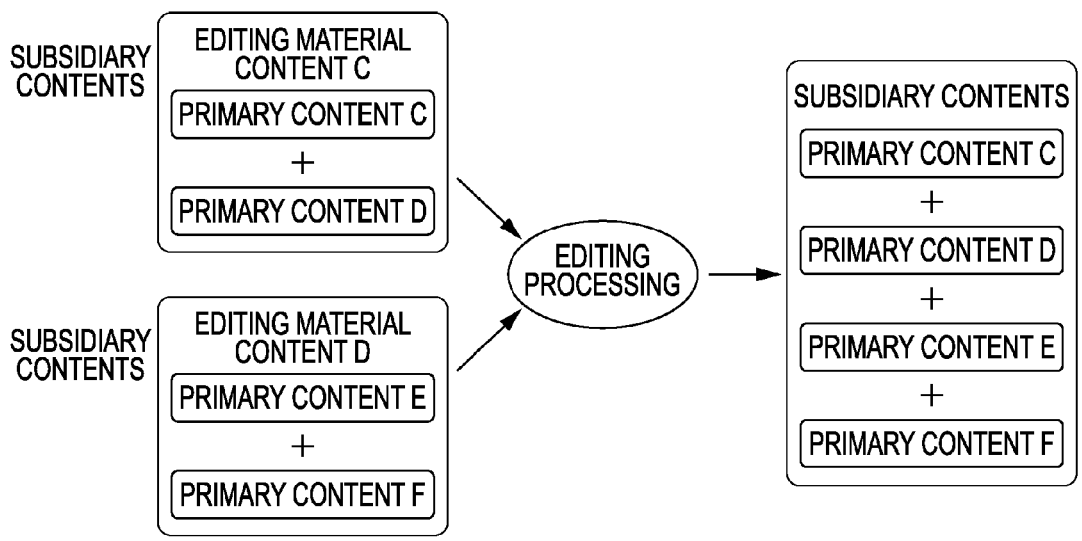

Now, FIGS. 5A through 5C illustrate a concept of creating subsidiary contents with the content creating/sharing application 100. As schematically illustrated in FIGS. 5A through 5C, the editing material contents A, B, and C which are objects of secondary use are used, and the user performs editing operations as to the content creating/sharing application 100 which reflect the intent of editing of the user. The content creating/sharing application 100 performs editing processing corresponding to the editing operations, and creates and outputs a subsidiary content file as a result. The structure of the subsidiary content file created in this way has the above-described playback control information as the main entity of the data.

The subsidiary content data serving as this playback control information (i.e., the subsidiary content playback control information) can be made markedly smaller in data size as compared to video data or audio data or the like, for example. Accordingly, the storage capacity of the storage medium such as the HDD or the like to store the subsidiary content data at the subsidiary content server 2 can be conserved and effectively used. Also, the amount of transmitted data is smaller at the time of transmission/reception of the subsidiary content data on the network, and accordingly does not make traffic heavier, for example.

Performing editing with already-existing contents as material, as with the secondary editing with the present embodiment, to create a secondary work as a new content, is called sampling, mash-up, and so forth, with professional musicians and the like also often performing this. In light of such, it is naturally conceivable that there is desire and demand of general people to create contents as secondary works in the same way. However, in reality, it is extremely difficult for general people to create contents as secondary works upon having properly cleared copyright issues.

Accordingly, as for the content creating/sharing system according to the present embodiment, an attempt has been made to increase the entertainment nature for the user, by first enabling general users to legally perform secondary editing using distributed contents.

To this end, the primary contents according to the present embodiment have been positioned as contents regarding which a user which has downloaded (purchased) is permitted to use secondarily in the range of rights which the copyright holder has authorized. That is to say, the content distribution service with the primary content server 1 according to the present embodiment is for distributing contents regarding which secondary usage has been proactively permitted. However, in the case of the present embodiment, the editing work which is secondary use of primary contents should be limited to user operations at the content creating/sharing application 100 developed for the content creating/sharing system according to the present invention at the least, and should be arranged such that the editing work is not performed by other editing software or the like unrelated to the content creating/sharing system according to the present embodiment.
Procedure 3

The data of the subsidiary content file created by the user A as described in Procedure 2 above is saved only at the user terminal device 4A, with playback processing being performed by the playback functions of the content creating/sharing application 100 as described later with FIG. 4, and images/audio of the contents can be played as the subsidiary content. With this in mind, the present embodiment further enables users who have the services of the content creating/sharing application 100 according to the present embodiment to share the subsidiary contents created by users, by making public on a network.

Now, let us say that the user A desires to share subsidiary contents created by the above Procedure 2. Accordingly, the user A performs predetermined operations as to the content creating/sharing application 100, so as to upload the data of the subsidiary content file created by the Procedure 2 to the subsidiary content server 2. This is Procedure 3.
Procedure 4

The subsidiary content server 2 saves the subsidiary content file transmitted as an upload as described above, so as to be newly registered in a database. At this time, the subsidiary content server 2 sets the saving location thereof (e.g., represented by an address such as a URL (Uniform Resource Locator)), and then performs saving processing of the subsidiary content file and registration thereof in the database.

Note that the subsidiary content server 2 has publishing functions with regard to the subsidiary content registered in the database. That is to say, the subsidiary content registered in Procedure 4 is subsequently published at the subsidiary content server 2, can be downloaded in response to download requests from the user terminal device 4 (content creating/sharing application 100).
Procedure 5

Upon saving and managing the subsidiary content file as described above, the subsidiary content server 2 transmits, to the upload requesting user terminal device 4A, an address indicating the saving location of the subsidiary content (subsidiary content file) that has been uploaded (saving location address), to notify the saving location thereof.

The content creating/sharing application 100 of the user terminal device 4A receives the above saving location address, and stores and saves, and manages this in a predetermined storage medium. The user A can, at any time, output the saving location address of the subsidiary content which he/she has uploaded by Procedure 2, by performing a predetermined operation as to the content creating/sharing application 100.
Procedure 6

As described earlier, the subsidiary content server 2 has a publishing function regarding the subsidiary contents registered in the database. Accordingly, the subsidiary content which the user A has created and uploaded this time can be browsed by users of an indeterminate number of user terminal devices 4 (content creating/sharing applications 100) accessing the content publishing site provided by the subsidiary content server 2, as a general principle. Also, with the present embodiment, the user terminal devices 4 of all users can download desired subsidiary contents, as a general principle.

Thereupon, the user A which has obtained the saving location address in Procedure 5 can announce to other users in several ways that his own subsidiary contents have been published at the subsidiary content server 2. Procedure 6 corresponds to one of the publishing announcement methods, and is carried out by accessing the communication server 3 as shown in the drawing, and writing to his own page in an SNS, or his own blog or the like, for example, that the subsidiary contents created by himself have been published. At this time, the URL serving as the saving location address obtained in Procedure 5 is also copied in so as to be written in.
Procedure 7

Upon a user B for example operating the content creating/sharing application 100 installed in the user terminal device 4B after the user A has written in as described above with Procedure 6 and accessing and browsing the page of the user A in the SNS or the blog of the user A, he/she knows that subsidiary content of the user A has been newly published. That is to say, in this case, the user B has indirectly received the announcement regarding the new publishing of the subsidiary content created by the user A, via the SNS or blog. Procedure 7 indicates such indirect announcement of subsidiary content publishing being performed.
Procedure 8

Procedure 8 will be given as another way for publishing announcement. As for this Procedure 8, the user B side is notified that the subsidiary content created by the user A has been disclosed by creating and transmitting mail using a mail function provided to the SNS, for example. This is a more direct form of announcement, as compared to the announcement according to the flow of the above-described Procedure 6 and Procedure 7. Also, in the event of announcing by e-mail and so forth in this way, the saving location address of the subsidiary content is copied into the body for example, so as to be listed.
Procedure 9

In this way, the user B can indirectly or directly receive announcement and know that the subsidiary content created by the user A has been newly published. In the event that the user B desires to enjoy the subsidiary content of the user A that has been newly published, first, the subsidiary content is downloaded by the content creating/sharing application 100. This is Procedure 9.

At the time of downloading the subsidiary content, a clicking operation or the like is performed as to the saving location address shown as a link in the body of the SNS diary page or blog, for example. Note that at the time of writing to an SNS diary page or blog, in the event the address information such as a URL is written in, this text string portion is presented as a link.

In response to performing a clicking operation as to the saving location address as described above, the content creating/sharing application 100 accesses this saving location address. That is to say, of the addresses on the subsidiary content server 2, an address indicating the location where the file of the subsidiary content which the user A has created and published (subsidiary content file) has been saved, is accessed. The subsidiary content file saved at that saving location is then sent out to the user terminal device 4B. The subsidiary content file set out in this way as received at the user terminal device 4B, and saving and management is performed under control of the content creating/sharing application 100. Accordingly, subsidiary content is downloaded.
Procedure 10

Upon the subsidiary content of the user A being saved and managed as described above, playing of the subsidiary content by the content creating/sharing application 100 of the user terminal device 4B becomes available. Procedure 10 is a procedure for playing subsidiary content file, so that the content of the subsidiary contents are output as video, sound, and so forth, in accordance with playback instruction operations as to the content creating/sharing application 100 by the user B.

FIG. 4 shows a playback concept of subsidiary contents with the content creating/sharing application 100. At the time of playing the subsidiary content, first, the content creating/sharing application 100 performs interpretation processing of the playback control information of the subsidiary content file which is the actual data. As a result of this interpretation, the content creating/sharing application 100 can recognize first, for example, which primary content file has the actual content data for playing (source editing material content), and also in the playing sequence, which portion of the actual content data (video data, audio data, etc.) of the source editing material contents have been used in what manner at what playing time, and so forth, for example.

In this diagram, an example of results is shown in a case that recognition has been made that source editing material contents A, B, and C have been used. Following the recognition results thereof, the content creating/sharing application 100 uses the actual contents of the primary content files serving as the source editing material contents A, B, and C, to execute playback control. Consequently, the content of the contents serving as the subsidiary content is played as images and sound.

According to the description of FIG. 4 above, playing of the subsidiary content has to have the actual content data of the source editing material content used for creating the subsidiary content. That is to say, with the present embodiment, in order to play a subsidiary content file, the data of the source editing material contents has to exist at the same local location as the content creating/sharing application 100, however temporarily. Accordingly, in the event that the source editing material contents are not locally saved as a primary content file at the time of attempting to play the subsidiary content, this has to be obtained locally.
Procedure 11

Accordingly, in such a case as described above, procedures have to be performed for downloading and acquiring any editing material contents which are not locally available. Procedure 11 in FIG. 2 is a procedure to be performed to this end in the process of playing contents with Procedure 10.

As can be understood from the description so far, the source editing material contents are actual content data, so as a principle, the source editing material contents are primary contents. Accordingly, in Procedure 11, the primary content server 1 is accessed by the user terminal device 4B (content creating/sharing application 100) and primary contents for playing the subsidiary content in this Procedure 10 but not existing locally are downloaded. Due to this downloading, the source editing material contents for playing the subsidiary content all exist locally, and playback output can be properly executed as described with FIG. 4.

Note that several forms of data of the primary contents existing locally due to the downloading in Procedure 11 can be conceived. First, a form can be conceived wherein this is made to exist locally, in a state of being stored in saved as to an auxiliary storage device such as an HDD, in the same way as with the case of a normal download according to Procedure 1. As for another, a form can be conceived wherein this is temporarily held in a main storage device such as RAM, and is erased in response to the content creating/sharing application 100 no longer being in a state wherein the playback operation of the subsidiary content can be performed, for example. While primary contents have been described as being basically charged for, for example, operations can be conceived wherein in the case of temporary storage, these are free of charge, or fees are set cheaper than normal downloads, or the like.

Also, according to the description of FIG. 2 above, with creating of subsidiary contents according to the present embodiment, primary contents are directly used as the contents of editing material (editing material contents), in a secondary usage manner. That is to say, the editing material contents in this case are primary contents of which the actual content data has to be used at the time of playing (also referred to as "source editing material contents").

However, not only primary contents but also subsidiary contents can be included as the editing material contents which are subjected to secondary usage in the present embodiment. This point will be supplemented with reference to FIGS. 5A through 5C. FIGS. 5A through 5C each illustrate cases of creating one subsidiary content by editing with secondary usage of two editing material contents.

First, FIG. 5A illustrates a case wherein the editing material contents A and B are each primary contents, in the same way as with the example of creating subsidiary content described with FIG. 2. That is to say, this shows creating of subsidiary content by executing editing processing with a primary content A taken as editing material content A, and a primary content B which is a different primary content taken as editing material content B. The subsidiary content in this case includes at least a part of the primary content A and primary content B as for the contents thereof, as shown in the drawing. That is to say, the primary contents A and B are used as the contents which are the original editing material (i.e., source editing material contents).

FIG. 5B illustrates creating a subsidiary content by editing with secondary usage of the editing material content A which is the same primary content as in FIG. 5A, and editing material content C which is subsidiary content created using primary contents C and D secondarily. The subsidiary content in this case includes at least a part of the primary content A included in the editing material content A, and at least a part of each of the primary contents C and D included in the editing material content C, as for the content of the contents thereof. That is to say, the primary contents A, C and D are used as the original editing material content, and accordingly, in the event of playing the subsidiary content shown in FIG. 5B here, the primary contents A, C, and D have to be locally situated.

FIG. 5C illustrates creating a subsidiary content by secondary usage of the two editing material contents C and D which are subsidiary contents. The subsidiary content newly created in this case includes at least a part of each of the primary contents C and D included in the editing material content C, and a part of each of the primary contents E and F included in the editing material content D, as for the content of the contents thereof. Accordingly, the primary contents C, D, E, and F have to be locally situated in the event of playing the new subsidiary content shown in FIG. 5C.

Also, in the event of using subsidiary contents as editing material contents for creating subsidiary content as in the above FIGS. 5B and 5C, first, the user performs download for example, and stores and saves at the user terminal device 4, in order to situate the subsidiary content serving as the editing material contents locally, in the same way as with handling primary content as editing material content.

Also, in the event of the subsidiary content server 2 performing transmission of subsidiary content data in response to the download request for subsidiary content, in according with Procedure 9 in FIG. 2, the subsidiary content is encrypted. This encryption can be decrypted by an authorized content creating/sharing application 100, but the content creating/sharing application 100 is arranged to operate such that only subsidiary content data decrypted by this encryption processing is played, and subsidiary content data not encrypted to begin with for example, or subsidiary content data encrypted by another format or algorithm, is not played. That is to say, the content creating/sharing application 100 only plays that downloaded and obtained from the subsidiary content server 2 with regard to externally-obtained subsidiary content data.

Accordingly, for example, even in the event that users directly exchange subsidiary content files between user terminal devices by direct communication such as P2P (Peer-to-Peer) network communication or e-mail file attachment or FTP (File Transport Protocol) or the like, or by direct exchange using removable media, files obtained by users in this way will not play properly since there is no encryption by the subsidiary content server 2. That is to say, with the present embodiment, subsidiary content of others will not play properly unless downloaded from the subsidiary content server 2. Accordingly, with the content creating/sharing system according to the present embodiment, circulation and reproduction of illegal subsidiary contents violating copyrights over the network is avoided. Thus, protection of the rights of copyright holders of the primary contents and subsidiary contents can be implemented.

As can be understood from the description in FIGS. 2 through 5C, with the content creating/sharing system according to the present embodiment, first, primary contents are downloadable. That is to say, users can download (purchase) and enjoy contents which they like by normal content distribution. Based on this, usage rights are set whereby secondary usage to take the primary contents as editing materials is enabled, so users can perform editing with the primary contents as materials and create their own works. Further, subsidiary contents which are works created in this way can be publicly published using communication techniques with CGM such as SNSs and blogs and so forth. That is to say, general users can edit contents with copyrights as material and create new contents (subsidiary contents) and further publicly publish the subsidiary contents, in a proper manner, which has heretofore been considered legally difficult due to problems such as copyrights and so forth.

Also, with the present embodiment, the actual entity of the subsidiary contents are playback control information, formed including at least description instructing playing of primary contents which are the original editing material used by the subsidiary contents.

The content creating/sharing application 100 has playback functions of the subsidiary content, but also has editing functions for creating the subsidiary content. Accordingly, as a form of playback of the subsidiary contents, the content creating/sharing application 100 can not only execute processing for simple audio playback, but also reflect the editing history of the subsidiary content being played in the user interface of the editing function described above, for example. That is to say, as a benefit of the actual entity of the subsidiary content being taken as the playback control information, the user can use the editing functions of the content creating/sharing application 100 to find out in detail how the downloaded subsidiary content has been edited.

Figure 6:
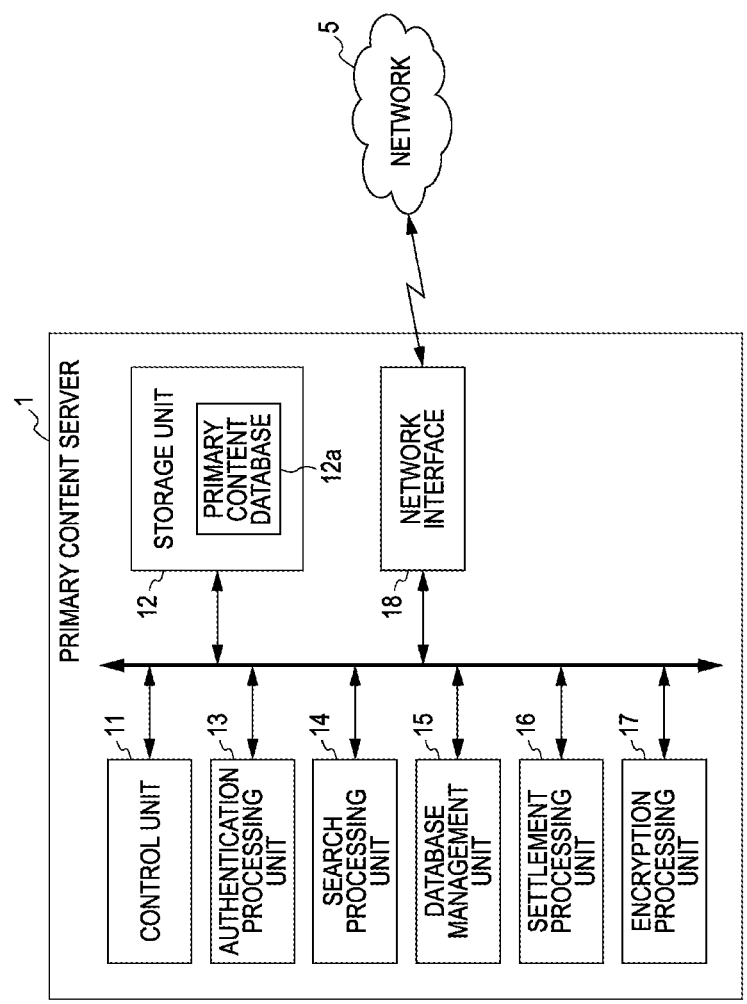
FIG. 6 is a diagram illustrating an internal configuration example of a primary content server.

Next, an example of a technical configuration for realizing the operations as the content creating/sharing system according to the present embodiment described so far, will be described. First, FIG. 6 illustrates an internal configuration example of the primary content server 1. As shown in this drawing, the primary content server 1 includes a control unit 11, a storage unit 12, an authentication processing unit 13, a search processing unit 14, a database management unit 15, a settlement processing unit 16, an encryption processing unit 17, and a network interface 18.

The control unit 11 is a member which centrally executes various types of control processing at the primary content server 1, and is configured having a hardware configuration equivalent to the center of a computer system, formed of, for example, a CPU (Central Processing Unit), RAM (main storage device), and so forth.

The storage unit 12 is configured having an HDD or the like for example, and stores a primary content database 12a. The primary content database 12a is information increments wherein data files serving as primary contents to be distributed have been databased.

The authentication processing unit 13 executes predetermined authentication processing regarding whether a valid user or not, in the event of a download request having been made for example, using the user ID and password and the like included in that request. Only in the event that the authentication processing results are OK is a primary content transmitted in response to the request.

The search processing unit 14 is a member which cooperates with the database management unit 15 to access the primary content database 12a and execute processing for searching for intended primary contents.

The database management unit 15 performs management with regard to the primary content database 12a. For example, in the event that new primary contents are supplied, the new primary contents are registered to the primary content database 12a which is updated in response thereto. Also, in the event of deleting primary contents, deletion of the primary content data and updating of the database correspondingly is performed in the same way.

The settlement processing unit 16 executes processing such as settlement as to payment of charges at the user side, relating to pay primary contents.

The encryption processing unit 17 is a member which executes processing for subjecting primary content data to be transmitted from the primary content server 1 to a user terminal device 4 to predetermined encryption.

The network interface 18 is a member for performing communication via the network 5, and reception of download requests and corresponding transmission of primary contents for example, are realized by the network interface 18 executing communication processing in accordance with the control of the control unit 11.

Figure 7:
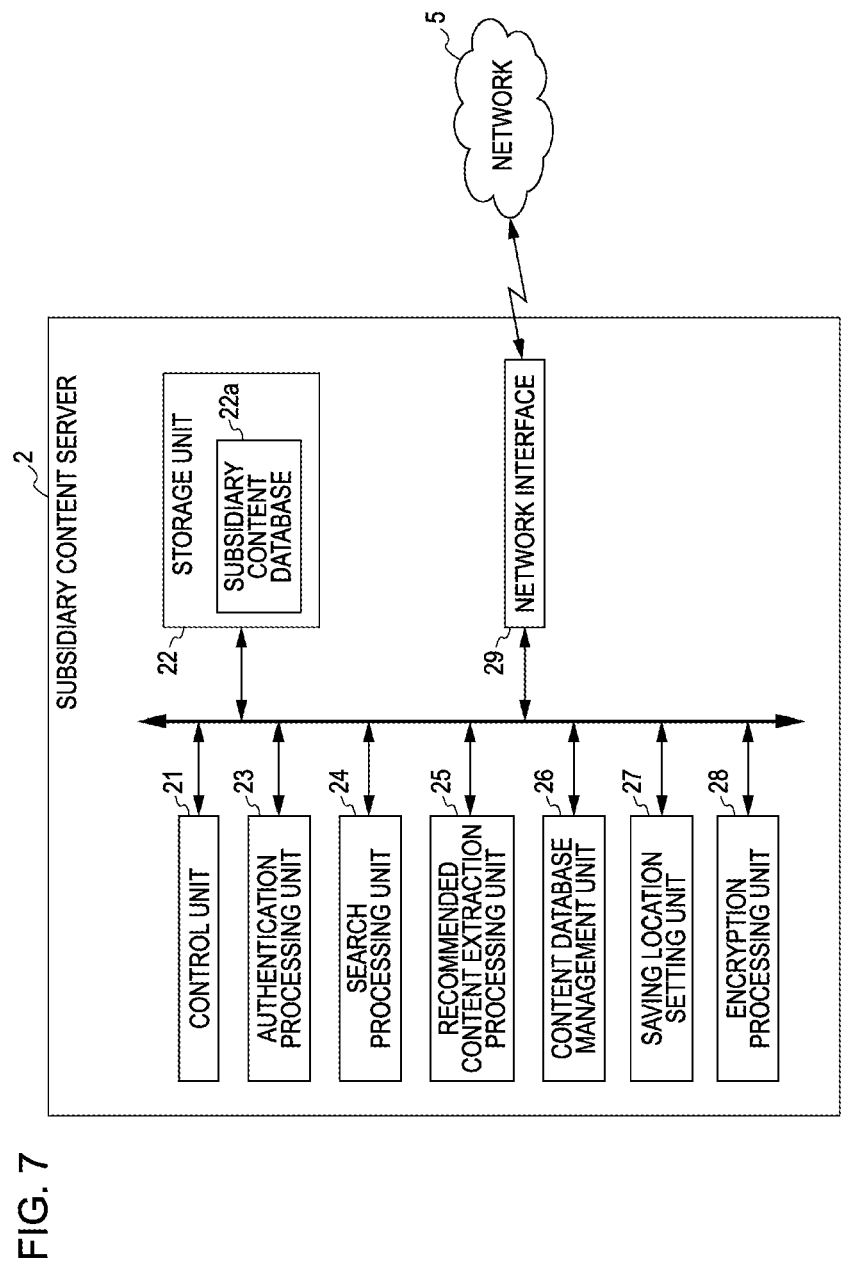
FIG. 7 is a diagram illustrating an internal configuration example of a subsidiary content server.

FIG. 7 illustrates an internal configuration example of the subsidiary content server 2. Here, the subsidiary content server 2 has a control unit 21, a storage unit 22, an authentication processing unit 23, a search processing unit 24, a recommended content extraction processing unit 25, a content database management unit 26A, a saving location setting processing unit 27, an encryption processing unit 28, and a network interface 29.

The control unit 21 is a member which centrally executes various types of control processing in the subsidiary content server 2. This also has a hardware configuration equivalent to the center of a computer system, formed of, for example, a CPU, RAM (main storage device), and so forth.

The storage unit 22 is configured having an HDD or the like for example, and stores a subsidiary content database 22a and a content profile database 22b.

The subsidiary content database 22a is information increments wherein subsidiary content files, have been databased.

The authentication processing unit 23 executes predetermined authentication processing regarding whether a valid user or not, in the event of a download request for subsidiary content having been made for example, using the user ID and password and the like included in that request.

The search processing unit 24 is a member which cooperates with the content database management unit 26 to access the subsidiary content database 22a and execute processing for searching for intended subsidiary contents.

The recommended content extraction processing unit 25 executes processing for extracting (searching) recommended contents from the subsidiary contents stored in the subsidiary content database 22a, and generating recommended content list information in which the extracted recommended contents are reflected.

Recommended contents are subsidiary contents which are deemed to be appropriate and suitable for each user (user terminal device 4), and having value of recommending to that user.

The content database management unit 26 performs management with regard to the subsidiary content database 22a in the storage unit 22. For example, in the event that new subsidiary contents (subsidiary content files) are uploaded, the uploaded subsidiary contents are registered to the subsidiary content database 22a which is updated in response thereto. Also, in the event of deleting subsidiary contents (subsidiary content files), deletion processing to this end and updating of the database corresponding to the deletion results is performed in the same way.

The encryption processing unit 28 is a member which executes processing for subjecting the subsidiary content data to be transmitted from the subsidiary content server 2 to a user terminal device 4 to predetermined encryption. Also, depending on the system operation, subsidiary content data may be encrypted and transmitted from user terminal devices 4 at the time of uploading subsidiary contents, and in this case, the encryption processing unit 28 is arranged to execute processing for decrypting the encryption thereof as well.

The network interface 29 is a member for performing communication via the network 5. Reception of uploaded subsidiary contents and download requests for example, and transmission of subsidiary content data corresponding to download requests (subsidiary content files) are realized by the network interface 29 executing communication processing in accordance with the control of the control unit 21.

Figure 8:
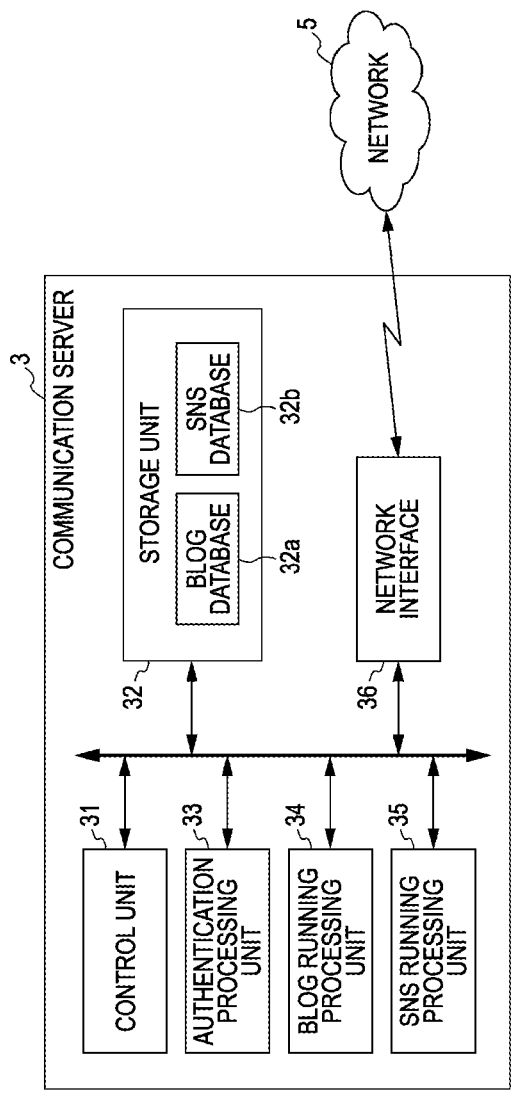
FIG. 8 is a diagram illustrating an internal configuration example of a communication content server.

FIG. 8 illustrates an internal configuration example of the communication server 3. As shown in the drawing, the communication server 3 includes a control unit 31, a storage unit 32, an authentication processing unit 33, a blog running processing unit 34, an SNS running processing unit 35, and a network interface 36. Note that the communication server 3 in this case provides communication services with blogs and SNSs.

The control unit 31 is a member which centrally executes various types of control processing in the communication server 3, and also has a hardware configuration equivalent to the center of a computer system, formed of, for example, a CPU, RAM (main storage device), and so forth.

The storage unit 32 is configured having an HDD or the like for example, and stores a blog database 32a and SNS database 32b. For example, the blog database 32a is information increments wherein data of a blog which the user has started have been databased. The SNS database 32b is information increments wherein page contents and the like of each SNS user have been databased.

The authentication processing unit 33 in this case executes authentication processing in response to logins for updating blogs, requests for SNS logins, and so forth, using the user ID and password and the like included in the requests. In the event that the authentication processing results are OK, the above login is successful.

The blog running processing unit 34 executes various types of predetermined processing for properly running a blog. For example, processing is executed such as transmission of blog screen data, transmission of blog posting screens, and so forth, in response to blog access requests from user terminal devices 4, valid blog posting screen requests, and so forth. Also, processing for managing the blog database 32a, such as updating the blog database 32a such that posts to the blog are reflected, is also executed.

In the same way, the SNS running processing unit 35 executes processing for properly running an SNS, such as processing for transmission of data of a page in response to SNS page access requests and database management beginning with updating the SNS database 32b such that posts such as diaries are reflected, and so forth.

The network interface 36 is a member for performing communication via the network 5. This enables transmission of page data in response to access requests for blogs and SNSs, and so forth.

Note that while the communication server 3 is provided corresponding to SNSs and blogs, but separate servers may be configured for SNSs and blogs, for example. Also, a configuration may be made to provide more basic CGM related services which have been widespread even before SNSs and blogs, such personal sites and homepages, for example, whereby individual users can post information other than SNSs and blogs and the like.

Figure 9:
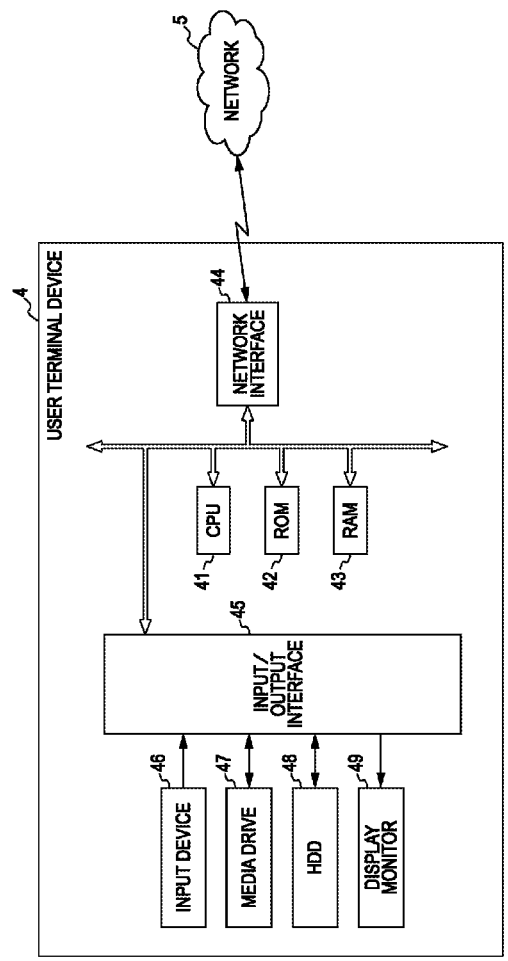
FIG. 9 is a diagram illustrating an internal configuration example of a user terminal device.

FIG. 9 illustrates an internal configuration example of the user terminal device 4. Note that in this case, the hardware serving as the user terminal device 4 is a personal computer.

First, the user terminal device 4 has a network interface 44 in order to perform communication via the network 5. Due to this network interface 44 having been provided, the user terminal device 4 can communication with, for example, the primary content server 1, the subsidiary content server 2, the communication server 3, and other user terminal devices 4 and so forth, via the network 5.

A CPU (Central Processing Unit) 41 is capable of executing various types of processing following an OS (Operating System) and various types of applications programs installed in an HDD (hard disk drive) 48 for example, and programs held in ROM 42. With the present embodiment, an application program serving as the content creating/sharing application 100 is to be installed.

RAM 43 is a work area for the CPU 41, and suitably holds data and programs and the like for the CPU 41 to execute various types of processing.

An input/output interface 45 in this case has an input device 46 which is a keyboard or mouse or the like for example connected thereto, with operation signals being output from the input device 46 being converted into signals suitable for the CPU 41 and output to the CPU 41.

Also, the input/output interface 45 has a media drive 47 connected thereto. This media drive 47 is a drive device configured such that data can be recorded to and played from removable media of a predetermined format.

Also, the input/output interface 45 has connected thereto an HDD 48 having a hard disk as a storage medium. The CPU 41 is arranged so as to be able to record or read out data and programs and the like to and from the hard disk of the hard disk drive 48, via the input/output interface 45.

Also, a display monitor 49 for displaying images is also connected to the input/output interface 45.

Figure 10:
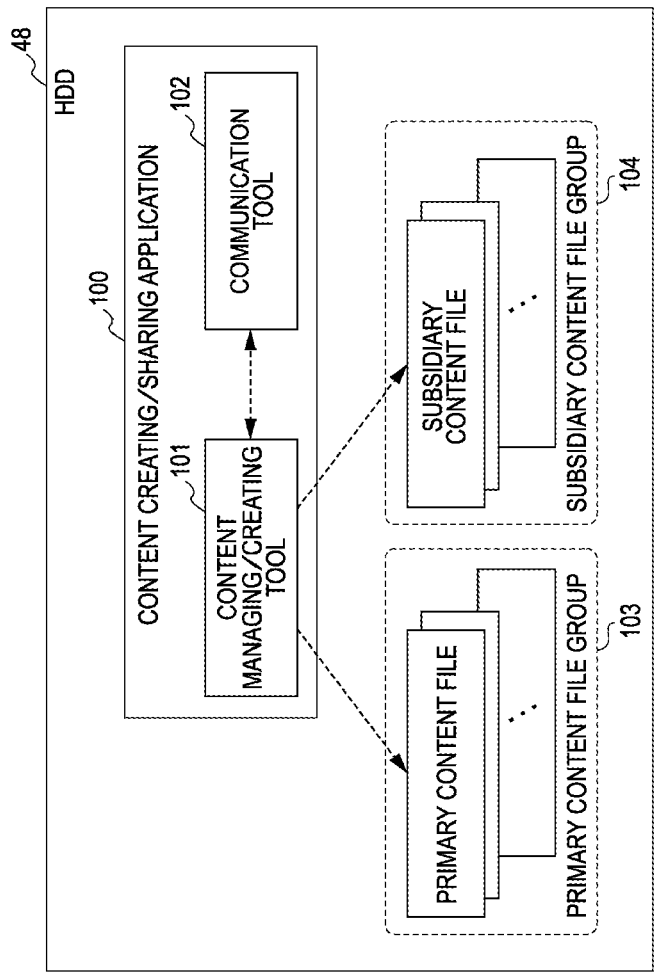
FIG. 10 is a diagram illustrating an example of data contents to be stored in an HDD of the user terminal device.

FIG. 10 illustrates a data content example stored in the HDD 48 with relation to usage of the content creating/sharing system according to the present embodiment.

As shown in this drawing, with relation to the content creating/sharing system according to the present embodiment, first, the content creating/sharing application 100 is stored as data of an application program. Note that storing of the content creating/sharing application 100 as to the HDD 48 is performed by installation processing. Also, as application files, one or more primary content files (primary content file group 103) and one or more subsidiary content files (subsidiary content file group 104) are stored under the control of the content creating/sharing application 100.

The content creating/sharing application 100 in this case can be viewed functionally as being generally configured of a program portion serving as a content managing/creating tool 101 and a program portion serving as a communication tool 102. The content managing/creating tool 101 is arranged to execute downloading of primary content files and subsidiary content files, and file operations with regard to primary content files of the primary content file group 103 and subsidiary content files of the subsidiary content file group 104. Also executed are editing processing in accordance with editing operations, subsidiary content file creating processing in response to editing results, and so forth. The communication tool 102 executes processing for accessing the communication server 3 and operating blogs and SNSs.

Figure 11:
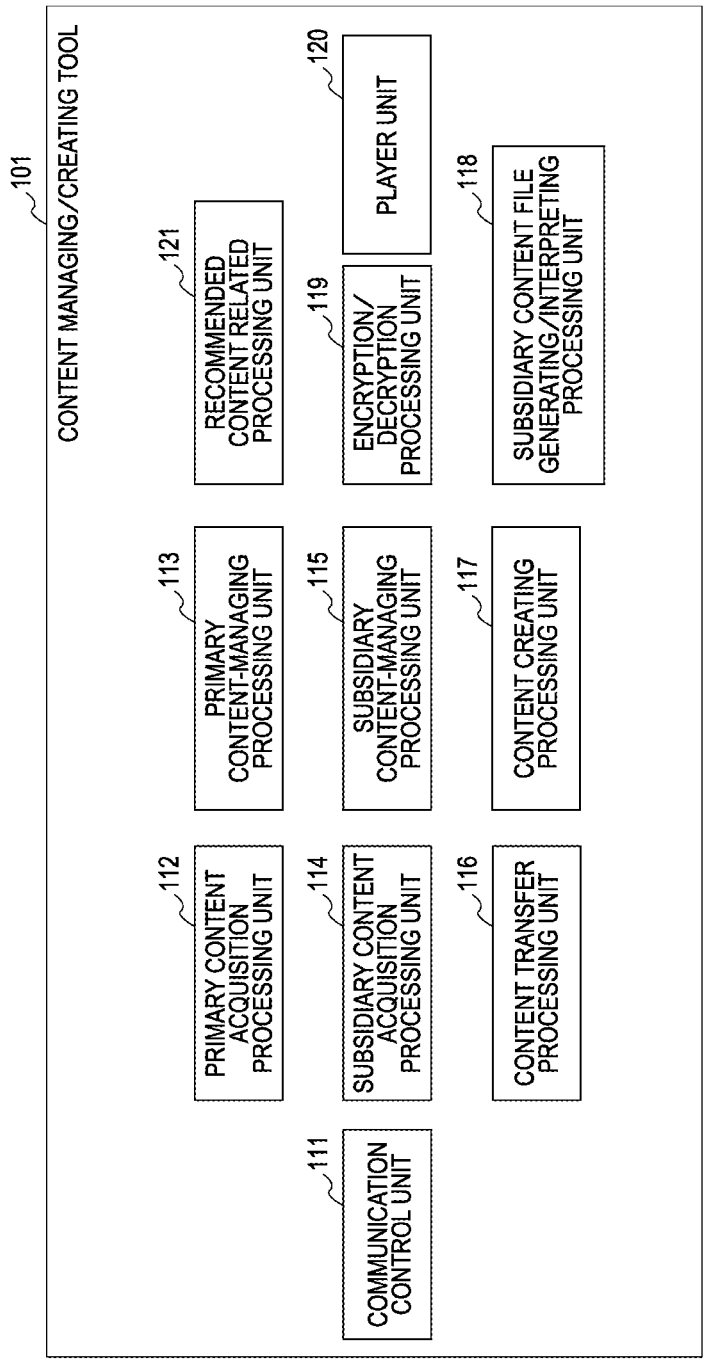
FIG. 11 is a diagram illustrating a program configuration example serving as a content managing/creating tool of a content creating/sharing application with functional blocks.

FIG. 11 is a schematic representation of the program configuration with regard to the content managing/creating tool 101 in increments of function blocks, and can be viewed of being made up of a communication control unit 111, a primary content acquisition processing unit 112, a primary content managing processing unit 113, a subsidiary content acquisition processing unit 114, a subsidiary content managing processing unit 115, a content transfer processing unit 116, a content creating processing unit 117, a subsidiary content file generating/interpreting processing unit 118, an encryption/decryption processing unit 119, player unit 120, and a recommended content related processing unit 121, as shown in the drawing.

The communication control unit 111 is a member made up primarily of programs for executing communication between the primary content server 1 and subsidiary content server 3 primarily with relation to content management/editing via the network.

The primary content acquisition processing unit 112 is a member made up of programs for downloading and acquiring primary contents. The primary content acquisition processing unit 112 provides a user interface for downloading primary contents. Also, control for issuing commands as download requests and causing transmission by the communication control unit 111, processing for receiving handover of packets of the primary content data received at the communication control unit 111 and restoring to the data format as primary contents and so forth, are also executed by this primary content acquisition processing unit 112.

The primary content managing processing unit 113 is a member for executing processing for saving the primary content files acquired by the primary content acquisition processing unit 112 in the HDD 48, and processing for managing the saved primary content files. For example, the primary content managing processing unit 113 also realizes content management such as sorting in accordance with artist name, album units, genre, and so forth.

The subsidiary content acquisition processing unit 114 is a member made up of programs for downloading and acquiring subsidiary contents.

The subsidiary content managing processing unit 115 is a member for executing processing for saving subsidiary content files acquired by the subsidiary content acquisition processing unit 114 in the HDD 48, and processing for managing the saved subsidiary content files.

The content transfer processing unit 116 executes control and processing such that data transfer of content files is executed properly via the communication control unit 111, such as for uploading subsidiary content files to the subsidiary content server 2, for example.

The content creating processing unit 117 is a member for executing processing relating to editing using the editing material contents shown in FIG. 3, i.e., creating the content of contents serving as subsidiary contents, in response to editing operations and the like performed by the user. Accordingly, a user interface for editing operations and so forth is also realized by this content creating processing unit 117.

The subsidiary content file generating/interpreting processing unit 118 first executes processing for generating the data of subsidiary content files in which the tune contents serving as subsidiary contents created by the content creating processing unit 117 are reflected. Also, in the event of playing subsidiary contents, interpretation processing is executed regarding the playback control information in the subsidiary content file shown in FIG. 4, and a playback processing sequence is determined.

With the present embodiment, primary content files are encrypted and transmitted from the primary content server 1. Also, encryption may be implemented at the time of transmitting subsidiary content files from the subsidiary content server 2 to a user terminal device 4 for downloading, and there are cases of transmitting with encryption in the case of uploading subsidiary content data from a user terminal device 4 to the subsidiary content server 2.

The encryption/decryption processing unit 119 executes processing for decrypting encryption in the event that a primary content file or a subsidiary content file that has been encrypted is used for operations for playing, editing, or the like. Also, processing for executing encryption is executed to perform encryption on the subsidiary content file and transmit, if this is the case.

The player unit 120 is a member for executing, in the signal processing process for playing primary content files and subsidiary content files as images, audio, and the like, predetermined signal processing which should be carried out at the digital signal format stage.

Now, a primary content file has, as the actual entity of data, actual content data which is video data or audio data or the like of a predetermined format, for reproducing the content of the contents. Accordingly, in the event of the player unit 120 playing a primary content file, the player unit 120 executes digital signal processing for playing the video data or audio data or the like which is the actual content data. In the event that this primary content file has been subjected to compression encoding, decoding processing corresponding to this compression encoding is performed, and playback signal processing is performed regarding the digital video signals or digital audio signals to be used.

Also, in the event of playing subsidiary contents, this executes playing processing serving as a sequencer, wherein the data portions of the used primary content files serving as source editing material contents are sequentially played following the sequence of playing processing determined by the aforementioned subsidiary content file generating/interpreting processing unit 118.

The recommended content related processing unit 121 realizes functions for recommending and presenting subsidiary contents to the user side, as described later.

Now, at the time of playing subsidiary contents, the results of interpretation of the playback control information by the subsidiary content file generating/interpreting processing unit 118 can be reflected in an editing work screen which is a GUI provided by the content creating processing unit 117. That is to say, the contents of playback instructions indicated by the playback control information can be displayed in a form which the user can recognized, on the editing work screen. The user can confirm in detail how that subsidiary contents was created, by viewing this. This means that how the creator created the subsidiary content can be obtained as accurate information. For example, in the case of general contents, in order for a general user to know how the content has been created, only estimation can be made from the visual content or the acoustic content which can be actually played and viewed or listened to, or the like.

In comparison with this, in the case of the present embodiment, how the subsidiary content has been created can be comprehended in further detail and more specifically. Sharing such subsidiary content among users can be expected to markedly improve the knowledge and skill of users using the content creating/sharing system according to the present embodiment with regard to content creating. The system according to the present embodiment has extremely high entertainment nature and usage value for users with interest in content creating.

Figure 12A:
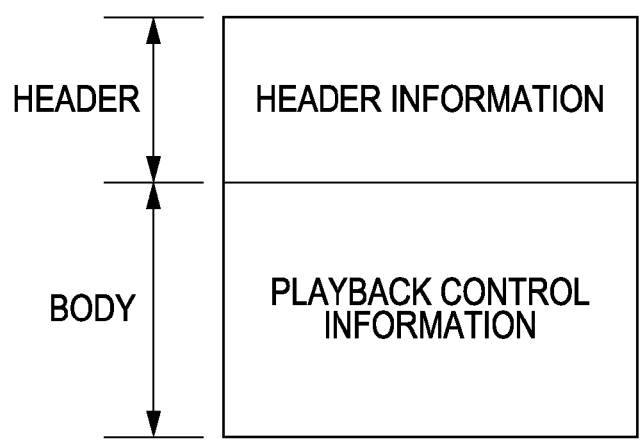
FIGS. 12A and 12B are diagrams schematically illustrating a structural example of a subsidiary content file and a primary content file.

Next, a structural example of content files (primary content files, subsidiary content files) corresponding to the present embodiment will be described with reference to FIGS. 12A through 14. First, FIG. 12A illustrates a configuration example of a subsidiary content file.

As shown in the drawing, the subsidiary content file is configured of a header and body (main portion). The header stores header information made up of a group of predetermined information items (metadata, added information) relating to the subsidiary content file. The body stores actual data corresponding to what is in the content of the content file. Accordingly, in the case of a subsidiary content file, playback control information is stored.

Figure 12B:
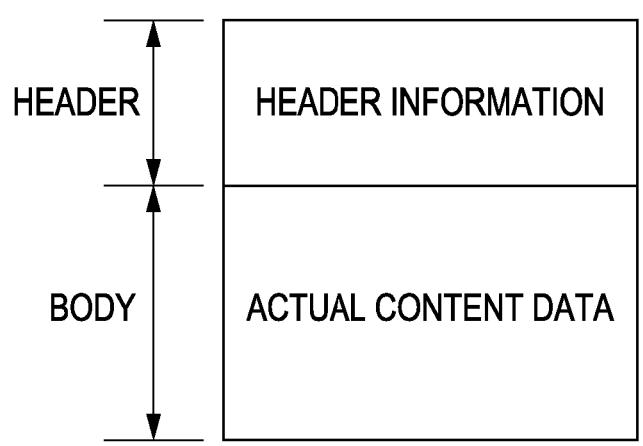

FIG. 12B illustrates a configuration example of a primary content file. The primary content file is also configured of a header and body, with the header storing header information made up of a group of predetermined information items (metadata) corresponding to the primary content file. The body stores actual content data of a predetermined format as the actual data corresponding to the content of the contents.

Figure 13:
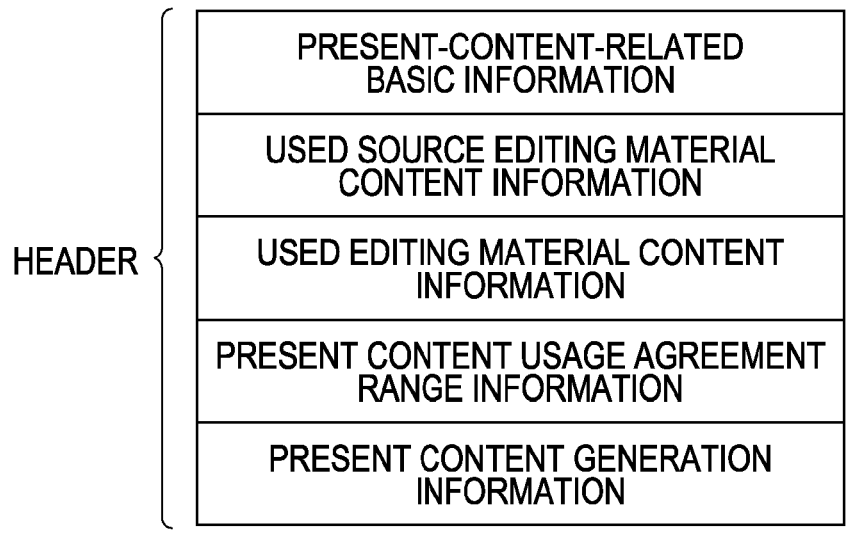
FIG. 13 is a diagram illustrating examples of information items forming header information of a content file.

Now, FIG. 13 shows an example of the content of header information which the header of the subsidiary content file stores. In FIG. 13, the information items (metadata items) making up the header information are present-content-related basic information, used source editing material content information, used editing material content information, present content usage agreement range information, and present content generation information. The present-content-related basic information is basic information items (metadata) relating to the present content file.

Figure 14:
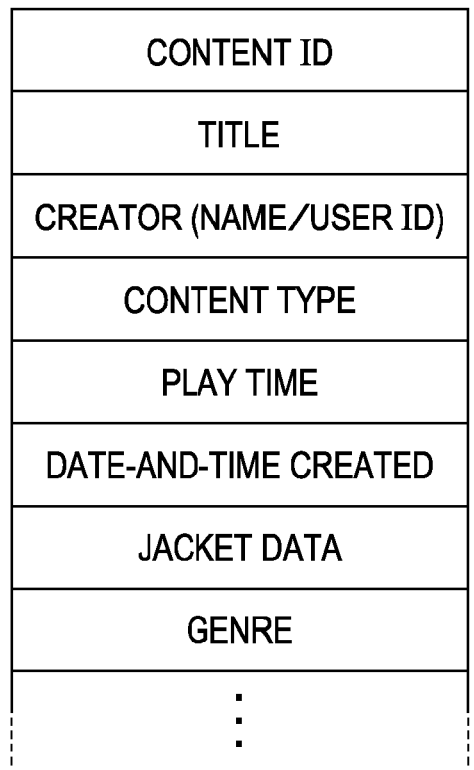
FIG. 14 is a diagram illustrating an example of information items forming present content related basic information, which is one of information items forming the header information.

FIG. 14 illustrates an example of an information item (metadata item) group making up the present-content-related basic information. Here, content ID, title, creator, content type, play time, date-and-time created, jacket data, genre, and so on, are shown.

The content ID here is an identifier uniquely given to each present subsidiary content. Note that with the present embodiment these content IDs are given to each content file by the content database management unit 26 of the subsidiary content server 2, for example.

The title is information indicating the title given to the present subsidiary content file.

The creator is information indicating the creator of the present subsidiary content file (also can be called "writer", "producer", "artist", or the like). Here, a name corresponding to the creator, and a user ID of the creator, are stored.

The content type is information indicating type, range, etc., of the content of the contents which the present subsidiary content file has, such as movies, tunes, photographs (still images), and so forth.

Play time is information indicating the total play time of the content serving as the present subsidiary content file.

Date-and-time created is information indicating the date and time at which the present subsidiary content file was created.

There are cases wherein a content is provided with image data, such as a jacket of an album. Jacket data is such image data.

The genre is information indicating what the genre given to the content of the contents serving as the present subsidiary content file.

Note that information items other than those listed here may be included in the present-content-related basic information as well.

Used source editing material content information is information indicating what the source editing material content (which is the used source editing material content) for playing the content of the contents serving as the present subsidiary content file is. In other words, this is information indicating which primary content like or subsidiary content file has had the actual content data thereof used for creating the present subsidiary content.

In correlation with FIGS. 5A through 5C, the primary content file shown as making up the subsidiary content newly created by editing processing is the above-described used source editing material content information. Accordingly, in the case of FIG. 5A, the primary contents A and B are shown in the usage primary contents information, in the case of FIG. 5B, the primary contents A, B, and C are shown, and in the case of FIG. 5C, the primary contents C, D, E, and F are shown.

Also, there may be a possibility that a certain primary content included in the editing material content may not be used at all in the content of the contents serving as the subsidiary content created by editing the editing material content. With the example of the case in FIG. 5B, with the new subsidiary content obtained by performing editing using the editing material contents A and C for example, there may be a possibility that the contents will be that which uses at least a part of the primary contents A and C, but not using the primary content D at all. In this case, only the primary content A and C are actual content data of primary contents for playing the subsidiary content, and the primary content D is unused.

With regard to how the contents of the used source editing material content information should be corresponding to such a case, there can be conceived one arrangement wherein the contents are such that only the primary contents A and C are shown and the primary content D is not shown, based on the idea that only primary contents actually used for playing the subsidiary content should be reflected.

As for another, there can be conceived another arrangement wherein the contents are such that all of the primary contents A, C, and D are shown. That is to say, this is based on an idea wherein, in this case, while the primary content D is not actually used, there has been the influence of the content of the contents serving as the primary content D to a certain extent in the process of creating the subsidiary content, and accordingly is equivalent to being used in an underlying manner. In this case, all primary contents which have been used even once up to the generation of the subsidiary content created this time are consequently included in the used source editing material.

As described later with reference to FIG. 15, the used source editing material content information also includes metadata of predetermined content, relating to the primary contents shown here.

Also, the used editing material content information is information indicating which editing material contents (used editing material contents, directly-used contents) have been directly used for creating the subsidiary content file.

With correlation to FIGS. 5A through 5C, stored in the used editing material content information of the new subsidiary content shown in FIG. 5A is data indicating the actual primary content files serving as the editing material contents A and B. Also, in the case of the new subsidiary content shown in FIG. 5B, data indicating the primary content file serving as the editing material content A, and the subsidiary content file serving as the editing material content C, is stored. Also, in the case of the new subsidiary content shown in FIG. 5C, data indicating the subsidiary content files which are the serving as the editing material content C and D is stored as used editing material information.

Note that, as shown in FIG. 15 which will be described later, the used editing material content information also has attached information of related predetermined contents for each of the editing material contents shown here.

The present content usage agreement range information is information of a usage agreement range set regarding the present content file. The structure should comply with the usage agreement range information of the configuration example described later with FIG. 15.

The present content generation information is information indicating what generation the present subsidiary content is, as a content created under the environment of the content creating/sharing system according to the present embodiment.

FIG. 15 illustrates structural examples of the used source editing material content information and used editing material content information. Note that here, the used source editing material content information and used editing material content information are shown as having a common basic structure. Accordingly, the content of FIG. 15 is shown with both the used source editing material content information and used editing material content information being shown in common.

As shown in this drawing, the used source editing material content information/used editing material content information primarily are made up of linked unit file information. Each unit file information corresponds to one used source editing material content information or used editing material content information.

Note that in order to simplify description, both used source editing material content information and used editing material content information will be referred to simply as "used content" in description of this FIG. 15 if there is no particular distinction therebetween.

For unit file information, for example, the items of content ID, creator, title, generation, and usage agreement range information are provided.

Here, content ID stores the content ID provided to the content file of the corresponding used content.

Creator stores the name of the writer of the corresponding used content, and the user ID of the creator.

Title indicates the tile of the corresponding used content as the name thereof.

The generation information item stores generation information. The generation information is information indicating what generation content the content is. With the content creating/sharing system according to the present embodiment, primary contents are defined explicitly as first-generation contents, while subsidiary contents are defined as being an N'th generation according to predetermined rules, corresponding to the generation of the editing material contents. Accordingly, in the event that the used content information shown in FIG. 15 is used source editing material content information, information indicating first generation will be stored in the time of generation information. Also, in the event that the used content information shown in FIG. 15 is editing material content information, information indicating the generation which is actually set in accordance with each used content (primary content or subsidiary content) corresponding to the unit file information is stored.

The information of the usage agreement range (usage agreement range information) is formed of a group of one or more usage items 1 through n.

The usage items 1 through n are assigned such that predetermined usage contents related to editing (secondary use) of corresponding usage contents correspond to each. Examples of usage contents to be appropriated to usage items which can be conceived include the following.

Contents relating to whether or not secondary usage of the present content is permitted Contents relating to using contents of another creator from the present contents, with regard to other contents to be used as editing material Contents relating to using contents of another album from that to which present contents belong, with regard to other contents to be used as editing material Contents relating to using particular effects and special effects Contents relating to using particular plug-in modules Extracting a part from the entire content and using as editing material Permission contents relating to the extracted actual content data portion in the event of extracting a part from the entire content and using as editing material Number of usable generations (for example, in the event of permitting use for two generations, i.e., up to the grandchild generation (third generation), as primary content, child subsidiary content using this primary content and grandchild subsidiary content using the subsidiary content can be created, but editing of the grandchild subsidiary content is not permitted with regard to the portion using the corresponding primary contents)

Contents relating to number and type of contents regarding which secondary use can be performed in combination with the present content Information indicating contents relating to usage authorization set for each usage item, beginning with permitted/not-permitted for example, is described for each of the these usage items. As for the information of the usage agreement range, generalizing the usage setting contents described for each of these usage items indicates the usage agreement range for the corresponding usage content.

With regard to the content of the header information of the primary content file, particular description by way of reference to the drawings will be omitted, and it should be noted that it is sufficient to have information defining the primary content file as being used. However, with the present embodiment, an arrangement wherein the header information of the primary content files have a common structure with those of the subsidiary content files can be considered to be appropriate. With such a primary content file header information structure, the header structure is standardized between primary contents and subsidiary contents, and which can be expected to lead to improved efficiency in content file management with the content creating/sharing system according to the present embodiment. One example thereof is that the primary content files will have present content usage agreement range information, so a usage agreement range which more accurately reflects the decisions and ideas of the writers can be set of the primary contents which are first-generation contents.

It should be noted though, that primary content files are not created secondarily using other contents. Accordingly, no meaningful information has to be stored regarding the used source editing material content information and used editing material content information shown in FIG. 16, in the header of the primary content files, for example.

Next, playback control information in subsidiary content files will be described. Playback control information is unit information made up describing a processing sequence for playing the content of contents serving as current subsidiary content, in a predetermined language, unlike actual content data. Elements of the description contents forming this playback control information include, for example, first, a description indicating primary content serving as actual content data used for playback, description indicating a data portion to be used for actual playing subsidiary content from the actual content data serving as this primary content, and description indicating the time for playing this data portion. Also, description for applying effects or special effects, such as fade-in, fade-out, overlap, equalizing (tone adjustment), playback speed rate, reverberation, delay, and so forth, for example, is performed.

FIG. 16 illustrates an example of the content of playback control information. In this drawing, the description portions between the brackets [ ] indicate the playback control content for one primary usage content (source editing material content).

An example of playback control content of a usage primary content unit shown in FIG. 16 will be described. First, as for the playback control content as unit of used content shown at the head in the drawing, [file_id=AAAAAA; time=00:00-00:10; position=vv-zz] is described. This specifies that the used content is specified by the content ID=AAAAAA (the descriptor of file_id here), and that the play time of the current subsidiary content using this usage content is 00:00 (start time)-00:10 (play time 10 seconds), and that the data section (section of actual content data) of the usage content used during this play time is a range corresponding to address vv through address zz.

For the playback control content of the subsequent used content unit, [file_id=AAAAAA; time=00:10-00:15; position=ss-tt] is described. This specifies that the usage content is specified by the content ID=AAAAAA, and that the play time of the current subsidiary content using this usage content is 00:10-00:15, and that the data section of the usage content used during this play time is a range corresponding to address ss through address tt.

For the playback control content of the subsequent used content unit, [file_id=BBBBBB; time=00:15-00:20; position=pp-uu] is described. This specifies that the usage content is specified by the content ID=BBBBBB, and that the play time of the current subsidiary content using this usage content is 00:15-00:20, and that the data section of the usage content used during this play time is a range corresponding to address pp through address uu.

For example, at the time of playback of the subsidiary content file, the player unit 120 of the content creating/sharing application 100 according to the present embodiment thus sequentially interprets the playback control contents of the usage content units in the brackets [ ], and executes actual playback control in accordance with the interpretation results, thereby playing and outputting the subsidiary content as video signals, audio signals, and so forth.

Next, an example of procedures relating to the primary processing relating to editing and creating of subsidiary contents will be described with reference to the flowcharts in FIGS. 17 and 18. Note that the processing shown in FIGS. 17 and 18 is realized by execution of a program serving as the content managing/creating tool 101 in the content creating/sharing application 100, for example.

Now, let us say that for example, a user of a user terminal device 4 has activated the content managing/creating tool 101 of the content creating/sharing application 100 and is ready to edit subsidiary content. Let us say that operations are performed such that content to use as material for creating subsidiary content is searched, and this is registered (finalized) as editing material content. In accordance with this, the processing shown in FIG. 17 is executed by the content creating processing unit 117 of the content managing/creating tool 101.

Figure 17:
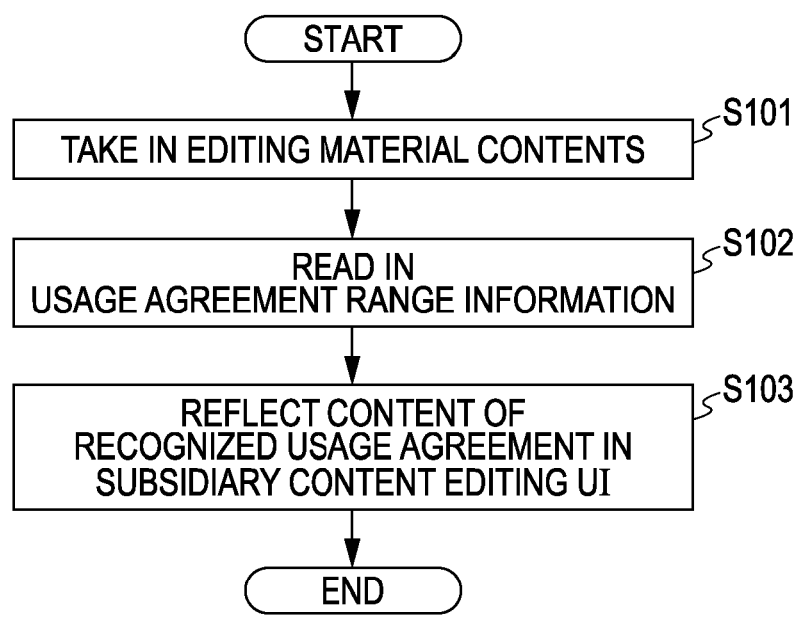
FIG. 17 is a flowchart illustrating an example of processing procedures for reflecting the usage agreement range settings for editing material contents on a user interface at the time performing subsidiary content editing processing by the content creating/sharing application.
Figure 18:
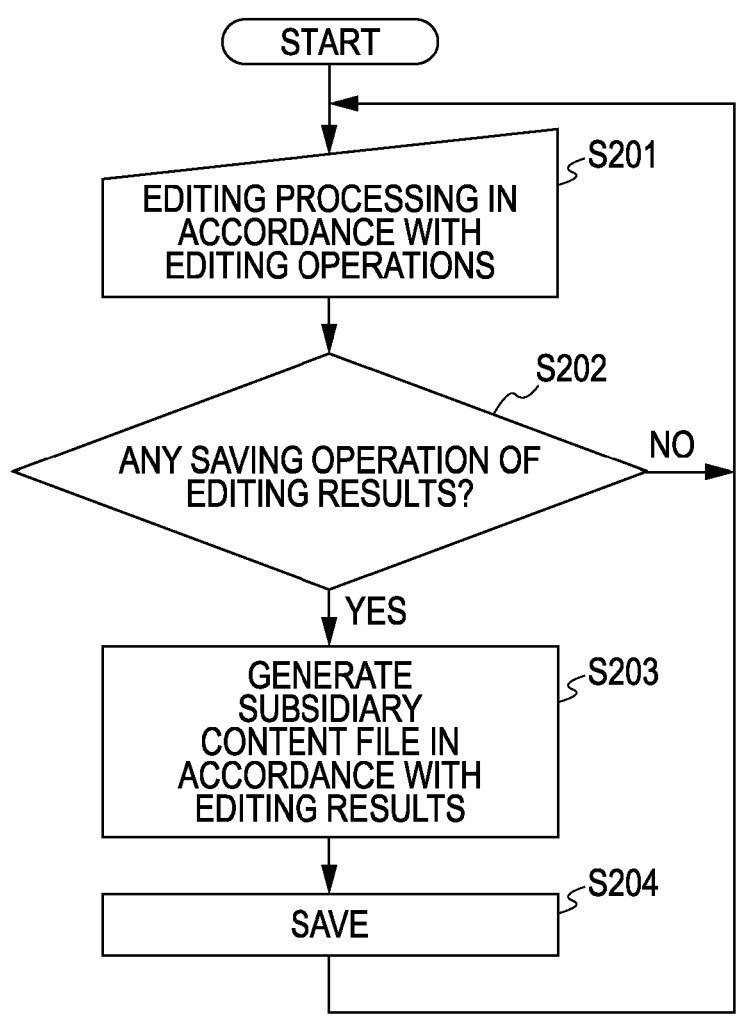
FIG. 18 is a flowchart illustrating an example of processing procedures up to the content creating/sharing application creating a subsidiary content file as subsidiary content editing processing.

In FIG. 17, first, in step S101, taking in of data of content registered as editing material content is executed. Note that in the event that the registered editing material content is a primary content, the data of the primary content file corresponding thereto is taken in, and in the event of a subsidiary content, the data of a subsidiary content file corresponding thereto is taken in.

In step S102, reading in of information of the usage agreement range is further executed from the data taken in by the above step S101. Thus, various contents relating to the usage agreement set with regard to the content registered this time as editing material content is recognized based on the content of the usage items 1 through n in the usage agreement range information. Accordingly, in the following step S103, the contents of the usage agreement recognized in correspondence with the above step S102 is set so as to be reflected on a user interface (UI) for subsidiary content editing. Due to this processing, the content creating processing unit 117 operates such that editing operations of content exceeding the usage agreement range set in the editing material content beforehand are unavailable.

FIG. 18 illustrates a basic processing procedure example relating to generating of a subsidiary content file which is the actual entity of data serving as the subsidiary content. The processing shown in this drawing is also realized by the CPU 41 executing a program serving as the content managing/creating tool 101, for example.

Here, first in step S201, appropriate editing processing in accordance with operation input for editing is executed. For example, the content creating processing unit 117 provides a GUI (Graphical User Interface) for the user to perform editing operations for creating subsidiary content, with the program thereof. The user performs editing operations for creating subsidiary content using this GUI, and the processing in step S201 is executed in accordance with this operation.

In the process of performing editing processing as described above, upon determination being made in step S202 that operations have been performed for saving the editing results so far, the flow proceeds to step S203. In step S203, a subsidiary content file corresponding to the content of contents obtained by the editing results so far is generated. At the time of generating the subsidiary content file, header information and playback control information reflecting the results of editing so far are generated, and these are combined to generate the file.

Control is executed in step S204 so as to save this subsidiary content file created as described above in an appropriate directory in the HDD 48 for example. Upon the procedure of step S204 having ended, the flow returns to step S201.

Note that when creating the subsidiary content file, the content of the present content usage agreement range information is also generated. As for how to set the contents of the present content usage agreement range information, an arrangement may be conceived to automatically set (contents for each usage item) following predetermined rules, in a range not exceeding a minimum determined summarizing the usage agreement range information for each primary content which is the source editing material, for example. Also, an arrangement may be conceived for settings are made corresponding to specification operations relating to the contents of the present content usage agreement range information which the user has performed, so that the intent of the user is reflected. However, even in the event of setting in accordance with user operations in this way, setting is performed in a range not exceeding a minimum determined summarizing the usage agreement range information for each primary content which is the source editing material, so that setting of usage agreement range (contents for each usage item) exceeding this is unavailable.

Note that while not shown in the drawing here, the processing shown in this drawing is left and the flow transits to other processing, in response to operations being performed to close the GUI screen for creating subsidiary content for example, or the like.

Figure 19:
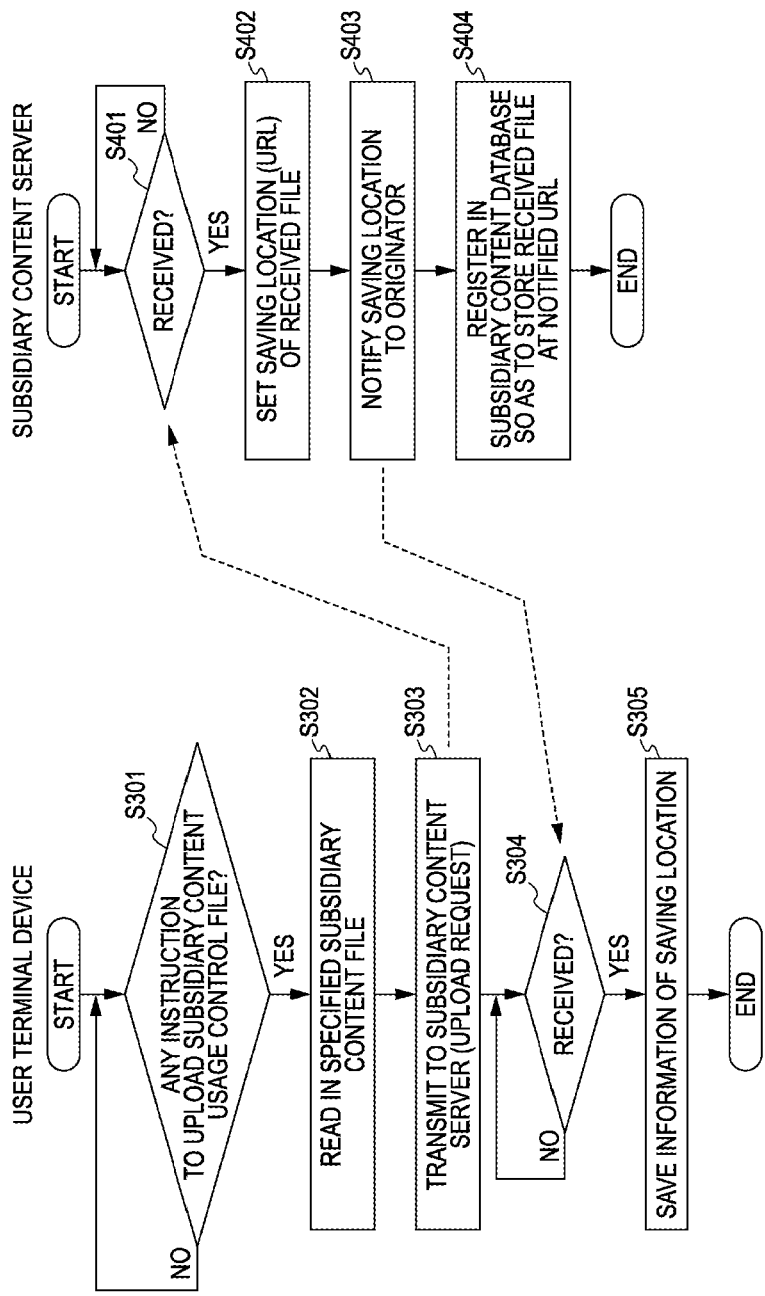
FIG. 19 is a flowchart illustrating uploading subsidiary contents by the user terminal device, and an example of processing procedures by the subsidiary content server in response.

Next, a processing procedure example relating to uploading of subsidiary content by the user terminal device 4, and a processing procedure example of the subsidiary content server 2 in accordance with this uploading, will be described with reference to the flowchart in FIG. 19. The processing at the user terminal device 4 side in the drawing is realized primarily by programs serving as the subsidiary content managing processing unit 115 and content transfer processing unit 116. The processing at the subsidiary content server 2 is executed by the members shown in FIG. 7 operating in cooperation, but in reality, can be viewed as being realized by the computer system (CPU) making up the subsidiary content server 2 executing programs.

The user terminal device 4 side in step S301 is awaiting obtaining of a command instructing uploading of a subsidiary content file.

Now, let us say that the user selects, as an operation as to the GUI provided by the content managing/creating tool 101, one or more subsidiary contents regarding which uploading is desired, and performs an upload execution operation. In response to this upload execution operation, a command is generated which instructs uploading of the subsidiary content file corresponding to the subsidiary content selected at the GUI, and the flow proceeds to step S302.

Note that the subsidiary content for this upload is subsidiary content created by the content creating/sharing application 100 and stored in the HDD 48 as an application file of the content creating/sharing application 100.

In step S302, the subsidiary content regarding which uploading has been specified, i.e., the subsidiary content file, is read in from the directory where it is stored. In the following step S303, control is executed such that the data of the subsidiary content file which has been read in is transmitted and output to the subsidiary content server 2 via network along with an upload request.

The subsidiary content server 2 is standing by in step S401 for reception of an upload request, and upon the upload request being received, the procedures from S402 and on are executed. Note that in order to actually transition to step S402 after receiving an upload request, confirmation is made that this is a request from a valid user, by way of authentication processing for example, but such processing procedures are omitted here.

In step S402, a saving location (URL) for the subsidiary content file received along with the upload request is set.

In step S403, communication processing for notifying the saving location of the subsidiary content file set in step S402 is performed as to the user terminal device 4 which is the originator of the upload request this time.

At the user terminal device 4 side which has performed in upload request in step S303 is awaiting reception of information of the saving location in step S304. Upon receiving information of the saving location, in step S305 information of the received saving location (URL) is saved in an appropriate directory. Thus, hereafter, the information of the saving location of the subsidiary content can be called up by performing a predetermined operation as to the content managing/creating tool 101. In the event that the saving location is a URL, a text string as the URL can be displayed, for example, depending on the call operation.

Figure 20:
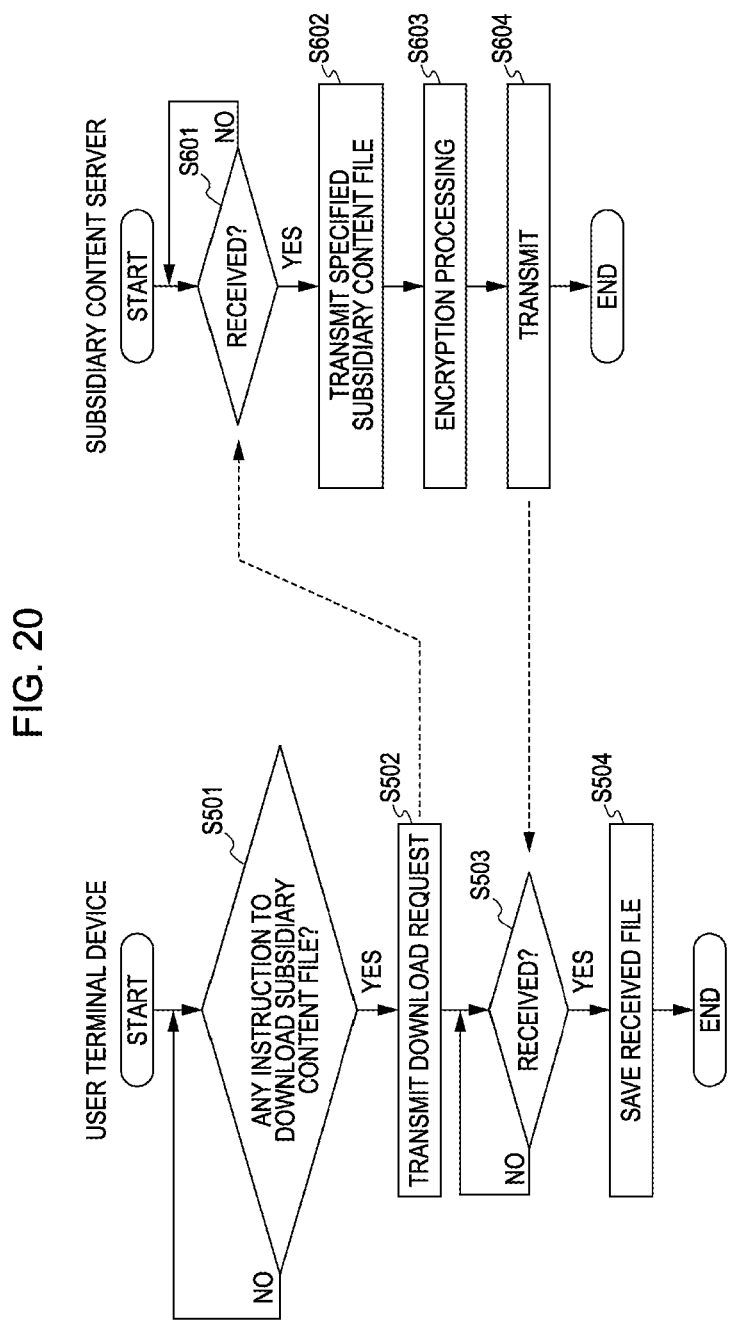
FIG. 20 is a flowchart illustrating downloading subsidiary contents by the user terminal device, and an example of processing procedures by the subsidiary content server in response.

The flowchart in FIG. 20 illustrates a processing procedure example relating to downloading of the subsidiary content by the user terminal device 4, and a processing procedure example at the subsidiary content server 2 corresponding thereto. The processing at the user terminal device 4 side in the drawing as well is primarily realized by programs serving as the subsidiary content managing processing unit 115 and content transfer processing unit 116.

First, in step S501, the user terminal device 4 side is awaiting obtaining of a command instructing downloading of a subsidiary content file. Here, let us say that for example, the user accesses a subsidiary content download site (Web site) provided by the subsidiary content server 2 for download of the subsidiary content, as an operation as to the content managing/creating tool 101, and causes display of a list of downloadable (shared) subsidiary contents. Further, let us say that the user selects one or more subsidiary contents which the user desires to download from the list, and performs operations for executing downloading. In response to this, a positive determination result will be obtained in step S501, and the flow proceeds to step S502.

In step S502, a download request is transmitted to the subsidiary content server 2 in response to a download instructing having been obtained. Note that as for this download request, information equivalent to specifying the directory (saving location) of the subsidiary content selected at the time of operation of the download execution instruction for example, is also included. Note that an arrangement may be conceived wherein instead of the saving location, a download request is made specifying the content ID of the subsidiary content file which is the actual entity of the subsidiary content and so forth, for example.

The subsidiary content server 2 is awaiting for a download request to be received in step S601, and upon an download request being received, executes the procedures in step S602. Note that in order to actually transition to step S602 after receiving a download request as well, authentication processing and the like transpires, but such processing procedures are omitted here as well.

In step S602, the subsidiary content database 22a of the storage unit 22 is accessed and the specified subsidiary content file is searched for, and the searched subsidiary content file is transmitted to the requesting user terminal device 4.

The user terminal device 4 which has transmitted the download request in step S502 awaits in step S503 for the subsidiary content file according to the download request to be received. Upon determining that the subsidiary content file has been received, in step S504, the received subsidiary content file is saved and managed in an appropriate directory.

Figure 21:
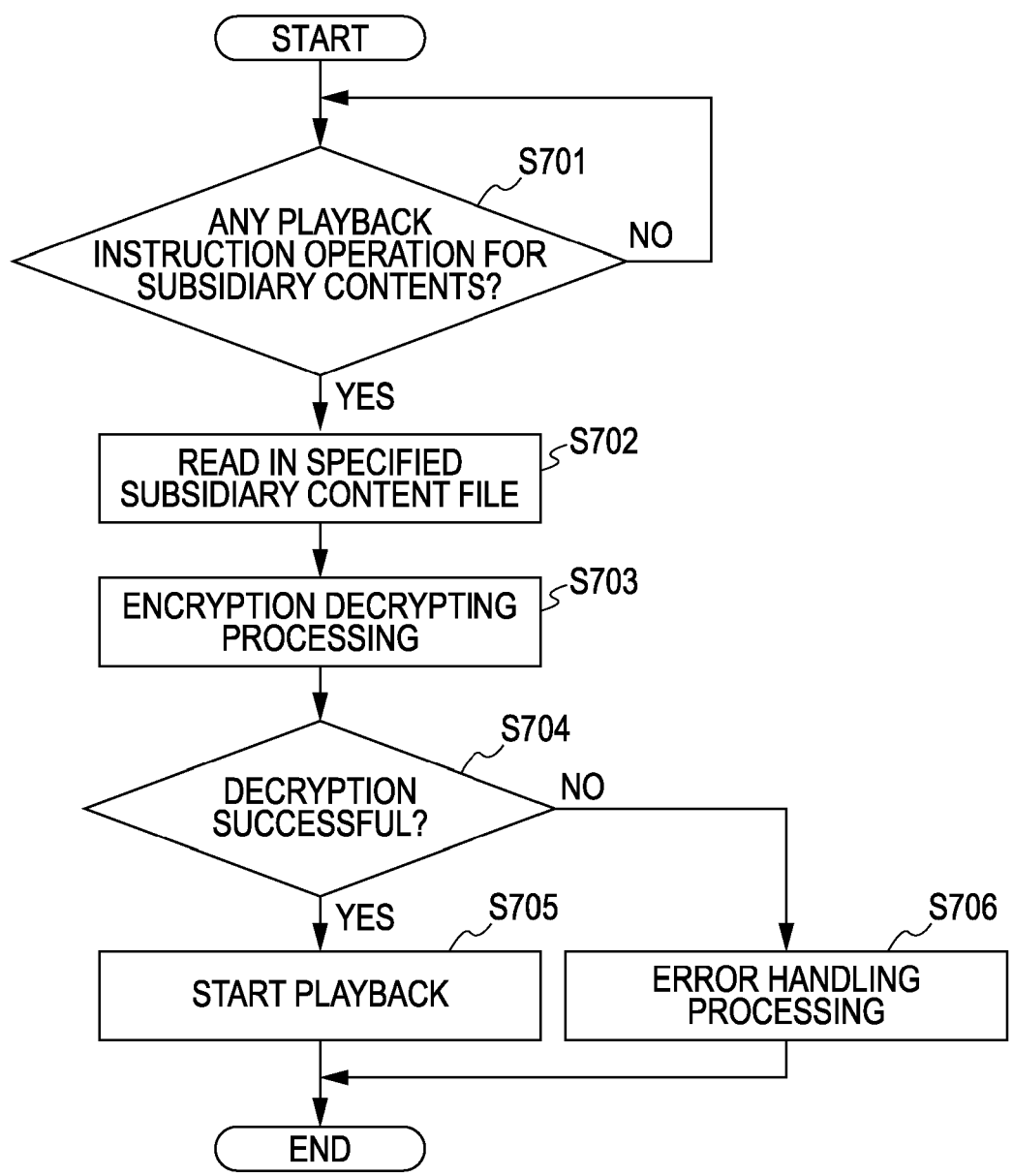
FIG. 21 is a flowchart illustrating an example of playing processing procedures of subsidiary contents by the user terminal device.

The flowchart in FIG. 21 illustrates a processing procedure example of the user terminal device 4 to play the subsidiary content obtained by downloading (saved in HDD 48), and the processing of the user terminal device 4 side in this drawing is realized by programs primarily serving as the subsidiary content managing processing unit 115, encryption/decryption processing unit 119, and player unit 120.

First, in step S701, obtaining of a playback start instruction regarding the subsidiary content file saved in the HDD 48 is awaited. Now, let us say that for example, as an operation as to the GUI provided by the subsidiary content managing processing unit 115, one subsidiary content is selected from the subsidiary contents saved in the HDD 48, and an instruction is given to start playing. In response to this, a positive determination result is obtained in step S701, and the flow proceeds to step S702.

In step S702, the subsidiary content file corresponding to the specified subsidiary content is read in from the HDD 48. Here, the subsidiary content data obtained by downloading is saved in the HDD 48 with the encryption at the time of transfer left. Accordingly, in the next step S703, processing for decrypting the read in subsidiary content data is executed by the encryption/decryption processing unit 119.

In step S704, determination is made regarding whether or not the encryption decrypting processing in the above step S703 has been successful.

For example, in the event that the subsidiary content data regarding which starting of playing has been specified this time in step S701 has been legitimately downloaded from the content server 2, the decrypting processing in step S703 will be successful and proper subsidiary content data will be restored.

Conversely, in the event that the subsidiary content data has been obtained by some way other than downloading from the subsidiary content server 2 for example, either encryption has been performed with another method or algorithm, or no encryption has been performed. In this case, depending on the decrypting processing in step S703, either proper subsidiary content data is not restorable, or decrypting processing is inapplicable. That is to say, as for the results of the decrypting processing in step S703, this can be viewed as failing, including cases that decrypting processing is inapplicable.

In the event that positive determination results have been obtained that the decrypting processing has been successful in step S704, the flow proceeds to step S705, and playback regarding the subsidiary content is started. That is to say, the generating/interpreting processing unit 118 interprets the playback control information to be played and determines a playing sequence, and controls the playback signal processing of the player unit 120 such that the actual content data portion of the primary content is sequentially played following the playing sequence.

Conversely, in the event that a negative decryption result has been obtained in step S704 that the decrypting processing has failed, the flow proceeds to step S706, and error handling processing is executed. As for this error handling processing, first, playback control processing regarding the subsidiary content regarding which playback has been specified this time is kept from being started, and thereupon for example, control processing for notifying on a GUI that the subsidiary content regarding which playback has been specified this time is unauthorized and unplayable, and so forth, is executed.

By such processing being executed for example, with the present embodiment, only subsidiary content information externally obtained which has been legitimately downloaded and obtained from the subsidiary content server 2 is played at the user terminal device 4, whereby the copyright of the primary content or subsidiary content is fully protected.

Note that as for an arrangement for playing and outputting only subsidiary content legitimately downloaded from the subsidiary content server 2, other arrangements can be conceived. For example, a configuration may be conceived wherein encryption is decrypted beforehand at the point of the user terminal device 4 receiving and obtaining as a download, and is stored in the HDD 48 with the decryption result information attached thereto, and at the time of playing, the attached information of the decryption results is referred to, so as to make determination regarding whether or not to play the subsidiary content. Also, an arrangement may be made wherein a special code indicating that transmission has been made for downloading is embedded in the subsidiary content as processing at the subsidiary content server 2 side at the time of transmission from the subsidiary content server 2, and at the time of playing, presence/absence of this code, and the content thereof and so forth is confirmed at the user terminal device 4 side, so as to determine whether or not to start playing.

Now, with a content creating/sharing system such as with the present embodiment, the number of subsidiary contents shared among users, i.e., the number of subsidiary content files which the subsidiary content server 2 stores and manages, can be massive.

Also, as described earlier, with the content creating/sharing system according to the present embodiment, even if there is no notification for introducing subsidiary contents from users who are friends, or the like, as described above, the download site of the subsidiary content serve can be accessed and desired subsidiary contents can be downloaded.

Taking such into consideration, it can be said that with the content creating/sharing system according to the present embodiment, how efficiently the user is going to be able to find suitable subsidiary contents from the massive number of subsidiary contents is important.

Accordingly, the content creating/sharing system according to the present embodiment aims to be able to efficiently select subsidiary contents suitable and appropriate for each user, and to be able to present these to the user. Additionally, a configuration which is as efficient as possible in reality is proposed in light of the current level of technology.

Note that to "present subsidiary contents suitable and appropriate for each user" according to the present embodiment means to recommend subsidiary content which would have value for listening/viewing for that user. That is to say, the following description can be said to be regarding a configuration for recommending subsidiary contents suitable of the user for each user. Also, in light of this, we will also so refer to subsidiary contents selected as being suitable of a certain user as "recommended contents".

Figure 22:
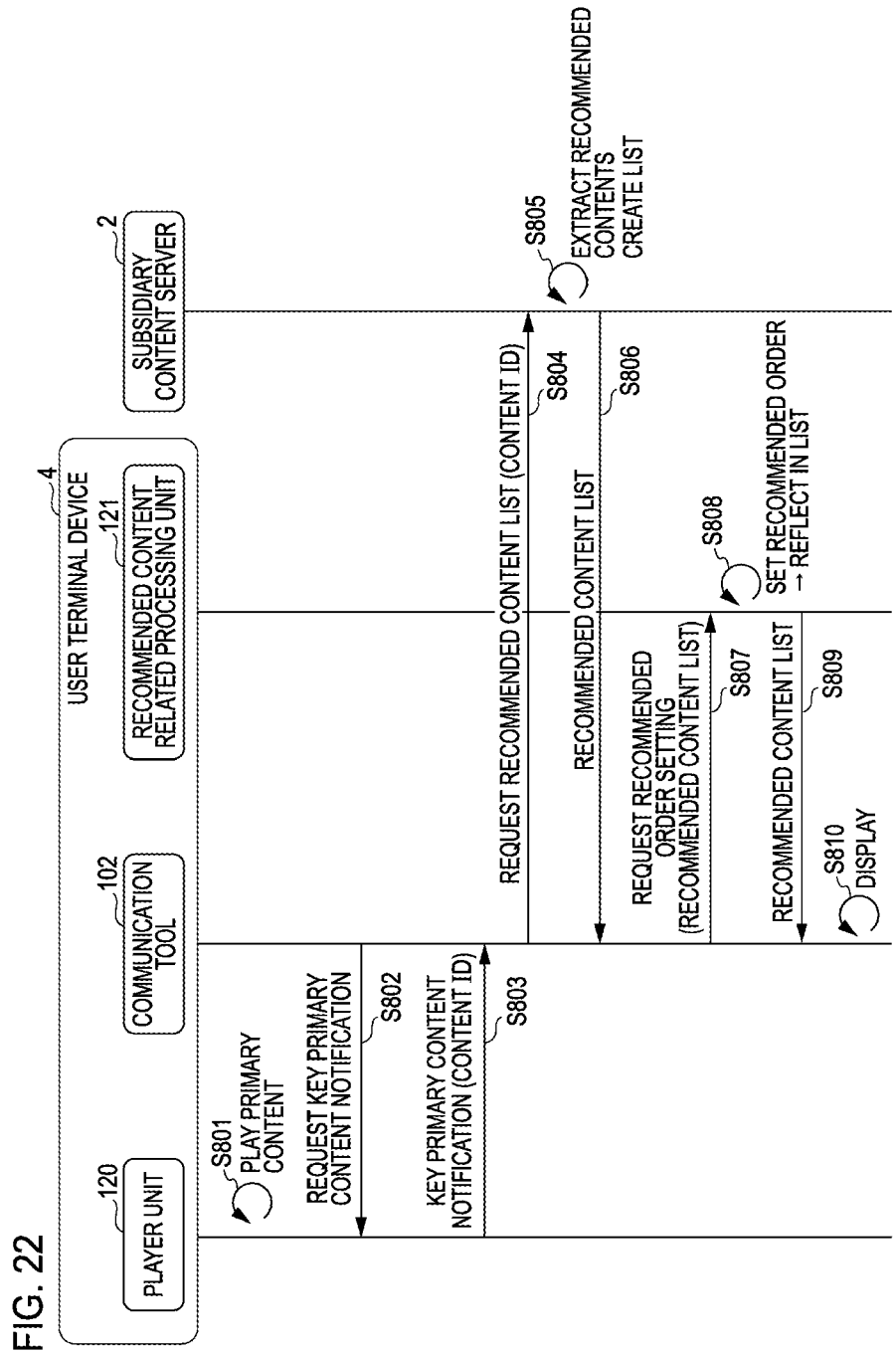
FIG. 22 is a sequence diagram illustrating an example of processing performed with the content creating/sharing system in relation to recommendation of subsidiary contents.

FIG. 22 illustrates an example of processing performed at the content creating/sharing system related to recommendation of subsidiary contents. Here, the player unit 120 (content managing/creating tool 101) at the user terminal device 4, the communication tool 102, recommended content related processing unit 121 (content managing/creating tool 101), and subsidiary content server 2 are shown as primary entities executing processing here.

In order to facilitate subsequent description, the overview of the operation of subsidiary content recommendation obtained by the processing shown in the drawing will be described. First, as for the state at the user terminal device 4, the communication tool 102 is arranged to operate when the player unit 120 is activated and a primary content is being played. In this state, the user terminal device 4 of which the communication tool 102 is the primary entity receives a list of recommended contents extracted from the subsidiary content server 2 in relation to the primary content currently being played at the player unit 120, and uses the data of this list to display and present recommended contents on the GUI screen with the communication tool 102.

Also, a primary content which is being played at the player unit 120 and serves as a key (extracting condition/search condition) for extracting (searching) the recommended contents as described above, will also be referred to as a "key primary content".

First, in step S801 in FIG. 22, we will say that the player unit 120 is executing processing of playing output of a certain primary content of the primary contents which the user of the user terminal device 4 can be viewed as holding.

Note that "holding" or "possessing" of a content by a user, as used here, refers in one sense to a state wherein a primary content file is stored and managed in a state where it can be viewed as being local as to the content creating/sharing application 100 (user terminal device 4) of the user, for example. Also, even if the primary content file is not locally existing, but existing on a server or the like, and can be accessed and played by the content creating/sharing application 100, for example, such a primary content file can be viewed as the user "holding". Examples of such primary contents include those which can be streamed or downloaded from a server under a content viewing/listening contract such as a subscription, and locally saved. This can also be said to be contents which the user does not have to pay for separately at the time of starting playing, but rather which the user has the right to play.

In a state wherein a primary content is being played at the player unit 120 in step S801 above, we will say that the communication tool 102 has also been activated and is running. In this state, as shown as step S802, the communication tool 102 makes a notification request to the player unit 120 to receive notification of what the primary content currently being played at the player unit 120 is, i.e., what the key primary content is.

Upon receiving the above notification request in step S803, the player unit 120 returns a content ID for example, as that identifying and indicating the key primary content, to the communication tool 102, as a response thereto.

The communication tool 102 which has received the content ID of the key primary content in response to step S803 executes processing in step S804 for requesting a recommended content list from the subsidiary content server 2. The recommended content list requested here is called unit information where recommended contents corresponding to the primary content currently being played in accordance with step S801 is shown. The processing of this step S804 transmits data serving as a recommended content list request to the subsidiary content server 2 by a program serving as the communication tool 102, from the user terminal device 4 via the network. Also, at the time of transmitting this recommended content list request, the content ID thereof is embedded in the operand thereof for example, as information for identifying the key primary content notified in step S803.

Note that the content ID of the key primary content exchanged in the processing in steps S803 and S804 is also referred to as "key content ID".

The subsidiary content server 2 which has received the recommended content list request in step S804 executes processing for extracting the recommended contents in step S805, and executes processing for creating a recommended content list (recommended content information) which is the content reflecting the extraction results of the recommended contents. Note that the processing in step S805 can be viewed as being executed primarily by the recommended content processing unit 25 in correlation with FIG. 7.

Now, an example of recommended content extracting processing which the recommended content related processing unit 121 executes in the step S805 will be described.

First, the basic concept of recommended contents extracting processing here will be described with reference to FIG. 23. Note that in the following description primary contents which the user of the user terminal device 4 is deemed to hold will be called "held primary contents". Also, a user who is playing a primary content with the user terminal device 4 (player unit 120) in FIG. 22 is a user who is an object of recommendation of subsidiary contents. This user will be called a "recommendation-receiving user".

Figure 23:
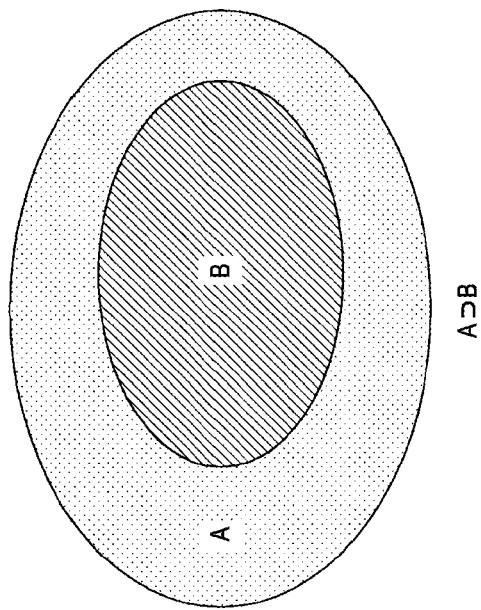
FIG. 23 is a diagram schematically illustrating the basic concept of recommended content extracting processing in FIG. 22.

Looking at the Venn diagram shown in FIG. 23, the set A is a set which takes as components thereof all subsidiary contents stored in the subsidiary content server 2 as the subsidiary content database 22a.

The set B is a set which takes as components thereof, of the subsidiary contents belonging to set A (subsidiary contents stored at the subsidiary content 2), the subsidiary contents including key primary contents used as source editing material (used source editing material contents). An idea implemented in this case is that, of the subsidiary contents stored in subsidiary content server 2, those with user-held primary contents as source editing material have the highest value of recommendation to the user of the held primary contents.

The reason is thus.

First, the held primary contents of a recommendation-receiving user are most likely a collection made in accordance with the preferences and tastes of the recommendation-receiving user. This means that we can estimate that the more held primary contents a subsidiary content has as the source editing material contents thereof, the more interest the recommendation-receiving user will be likely to have in the subsidiary content, and also most likely match the tastes thereof.

Also, with the present embodiment, at the time of the user obtaining primary contents by downloading or the like, the user pays for the contents as a rule. Held primary contents are contents which the user has already obtained. Accordingly, if held primary contents are included in the source editing materials, the fewer primary contents the user has to purchase, meaning that the cost is lower for the user.

Accordingly, with the present embodiment, we will say that subsidiary contents using one or more held primary contents as the source editing material contents will be extracted (selected) as recommended contents.

In correlation with FIG. 23, subsidiary contents belonging to set B will be extracted as recommended contents.

On the other hand, as for subsidiary contents of the set A which are a complement to set B, i.e., subsidiary contents which do not use even one held primary content as source editing material content are removed from the recommended contents. We can estimate that regarding such recommended contents, the recommendation-receiving user will likely have little interest in such a subsidiary content, and the subsidiary content will also likely not match the tastes of the recommendation-receiving user. Moreover, such subsidiary contents will cost the user more.

In step S805 in FIG. 22, a specific example of processing for extracting subsidiary contents belonging to set B in FIG. 23 above as recommended contents is as follows.

That is to say, the recommended content processing unit 25 searches the used source editing material content information for a subsidiary content including the key content ID obtained in step S804, from the subsidiary contents registered in the subsidiary content database 22a.

The used source editing material content information indicates the content ID of the primary content serving as the source editing material of the present subsidiary content i.e., for playing. Accordingly, including a key content ID in the used source editing material content information means that key primary content, i.e., the primary content currently being played at the player unit 120, is included as the source editing material of the present subsidiary content. That is to say, subsidiary contents belonging to the set B in FIG. 23 are extracted as a result.

Next, the recommended content processing unit 25 creates a recommended content list which is content information indicating the subsidiary contents extracted as recommended contents as described above in the same step S805.

Note that the recommended content list can be created from metadata of predetermined definitions for each extracted subsidiary content, for example. At this time, the metadata for each subsidiary content can be obtained based on the header information in the subsidiary content file, for example.

Figure 24:
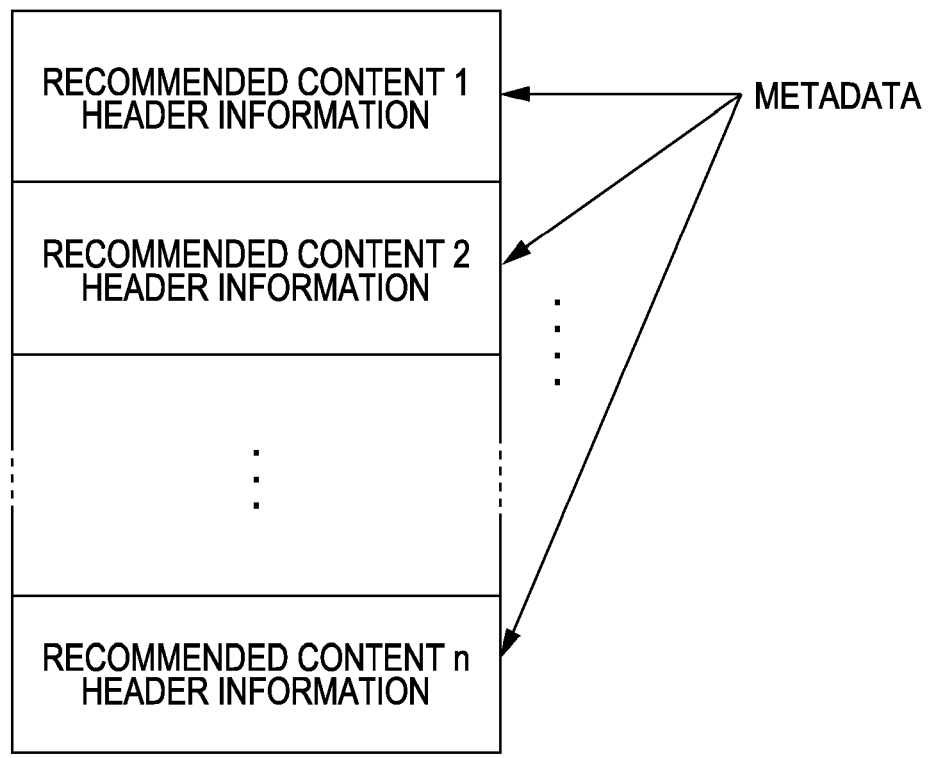
FIG. 24 is a diagram schematically illustrating an example of the stricture of a recommended content list.

FIG. 24 shows a schematic example of the structure of a recommended content list. With the recommended content list in this case, header information in the subsidiary content file is extracted for each extracted recommended content 1 through n, and these are arrayed. The header information can be viewed as being a set of metadata relating to the subsidiary contents corresponding to the header information, so this recommended content list also can be said to have a structure as a metadata group for each extracted recommended content.

The recommended content list created as described above is transmitted to the requesting user terminal device 4 via the network 5 in step S806, under the control of the control unit 21, for example. The user terminal device 4 in this case receives data of the received recommended content list with the communication tool 102.

Now, the recommended content list at the stage of having been received in step S806 by the communication tool 102 only shows subsidiary contents matching the recommended contents, with no priority order, i.e., recommendation order, for recommendation, being shown.

For example, if recommended contents can be presented to the user along with an appropriately-set recommendation order thereof, the user will be able to efficiently narrow down the presented recommended contents are compared with a case wherein recommended contents are presented without any recommendation order set.

Accordingly, in response to having received the data of the recommended content list, the communication tool 102 performs a recommendation order setting request to the recommended content related processing unit 121, as shown in step S807. At the time of this recommendation order setting request, the communication tool 102 for example hands the data of the recommended content list obtained in step S806 to the recommended content related processing unit 121.

In step S808, in response to the recommendation order setting request, the recommended content related processing unit 121 first sets a recommendation order regarding the subsidiary contents registered in the recommended content list, and next reflects the set recommendation order in the recommended content list.

While various algorithms may be conceived for setting the recommendation order in step S808, here, the recommendation order is set based on the usage state (inclusion state) of the held primary contents of the recommendation-receiving user in the recommended contents (subsidiary contents).

As described earlier with FIG. 23, regarding subsidiary contents having the nature of secondary creations, an idea can be employed that "those with held primary contents of the recommendation-receiving user as source editing material have high value of recommendation to the recommendation-receiving user". Based on this idea, we can say that "those using more with held primary contents of the recommendation-receiving user as source editing material have higher value of recommendation to the recommendation-receiving user".

Figure 25:
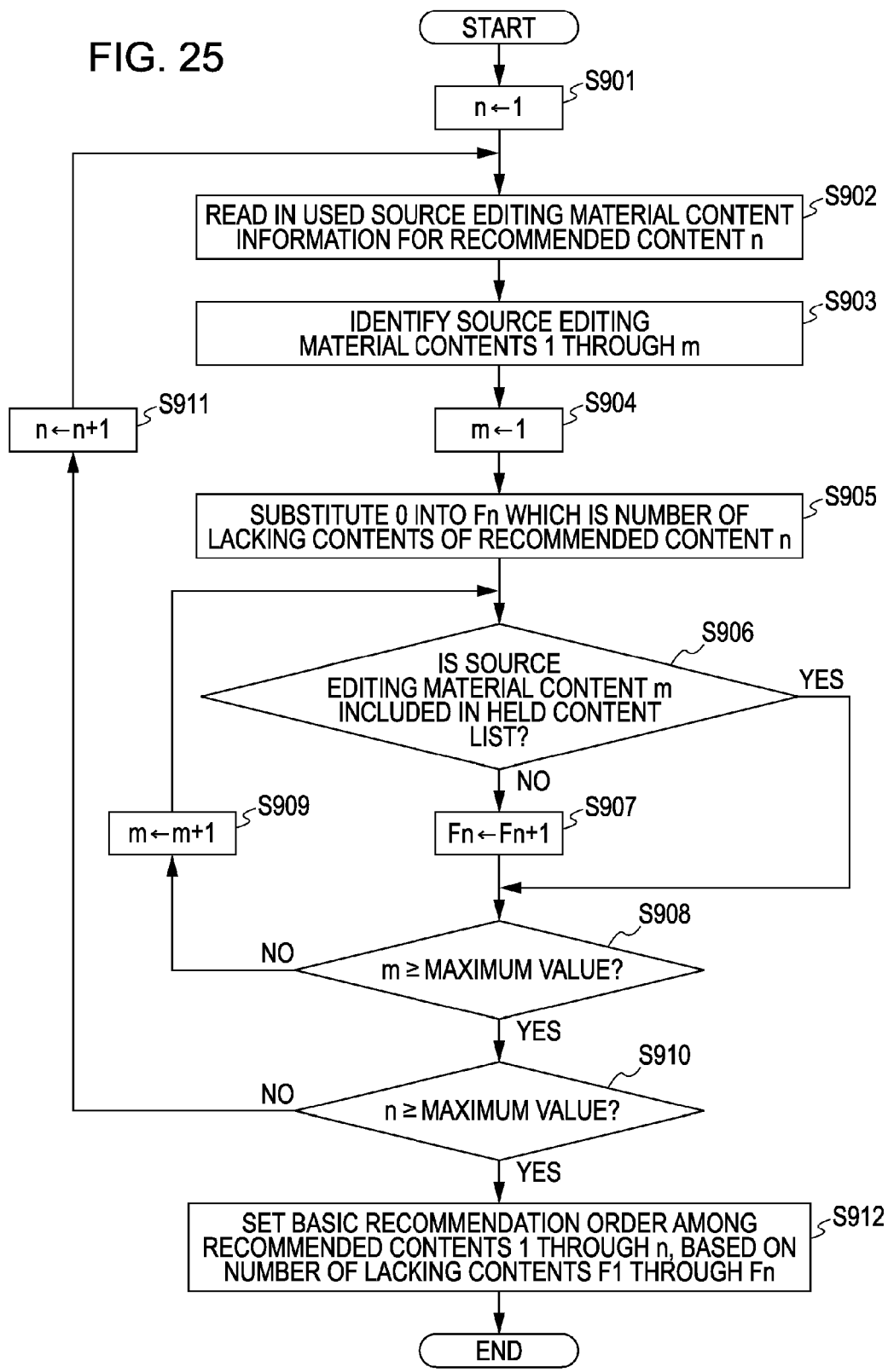
FIG. 25 is a flowchart illustrating an example of processing procedures for setting the recommendation order in FIG. 22.

FIG. 25 illustrates a flowchart of an example of processing procedures in step S808 for setting recommendation order based on the usage state (inclusion state) of held primary contents of the recommendation-receiving user, in accordance with the above idea. In FIG. 25, in step S901 the recommended content related processing unit 121 first performs initialization by substituting 1 into the variable n indicating the No. of recommended contents. Note that the No. assigned as the variable n here is given to the subsidiary contents registered in the recommended content list for the sake of convenience, and has nothing to do with the recommendation order.

In step S902, the recommended content related processing unit 121 reads in used source editing material content information, which is one of the metadata of the n'th recommended content (recommended content n), from the recommended content list. Note that the used source editing material content information is information originally included in the header information of the subsidiary content, and has the content described with FIG. 15, for example. That is to say, the recommended content list in this case includes the used source editing material content information as metadata for each subsidiary content.

In step S903, the recommended content related processing unit 121 identifies the source editing material content (primary content) used in the recommended content n, by referring to the used source editing material content information read in the step S902. Note that the m identified source editing material contents are denoted by numerals 1 through m following a predetermined rule in this case as well.

Steps S904 and S905 are initialization processing for steps S906 through S909. In step S904, 1 is substituted into the variable m indicating the No. of the source editing material contents identified in step S903. In step S905, 0 is substituted into the variable Fn representing the number of lacking contents for the recommended contents n.

Note that "lacking contents" here refers to primary contents (source editing material contents) which have to be had for playing the subsidiary contents as recommended contents, which are not held primary contents of the recommendation-receiving user.

Also, the number of lacking contents can be said to represent how much the held primary contents are used (included) in the primary contents serving as source editing material (usage state/inclusion state).

For example, the content managing/creating tool 101 manages the held primary contents of the corresponding user. Due to this management, the content ID of each held primary content can be found out. Also, this management can be executed by the primary content managing processing unit 113, for example, in correlation with FIG. 11. Alternatively, a configuration can be conceived wherein this is managed by the player unit 120 as a primary content which can be played by itself.

In step S906, the recommended content related processing unit 121 determines whether or not the primary content which is the source editing material content m is included in the held primary contents. This can be performed by searching through the content IDs of the held primary contents for a content ID matching that indicated by the source editing material content m. In step S906, if a content ID is found in the held primary contents matching the content ID indicating the source editing material content m, a positive determination result is obtained, and if not found, a negative determination result is obtained.

In the event that a positive determination result is obtained in step S906, the step S907 is skipped and the flow advances to step S908.

Conversely, in the event that a negative determination result is obtained, the variable Fn is incremented in step S907 and the flow proceeds to step S908.

In step S908, the recommended content related processing unit 121 determines whether or not the current variable m has reached the maximum value or higher. The maximum value of the variable m is the number of source editing material contents identified in step S903.

In the event that a negative result is obtained in step S908, this means that there remain source editing material contents regarding which determination has to be made regarding whether or not included in the held primary contents, so the variable m is incremented in step S909 and the flow returns to step S906. Accordingly, determination is made in step S906 regarding the source editing material contents 1 through m, and in the event that a negative editing result is obtained here, the variable Fn is incremented.

As a result of determination being performed in step S906 regarding all source editing material contents 1 through m, a positive determination result is obtained in step S908, and the flow proceeds to step S910. In the event that a positive determination result is obtained in step S908, this finalizes the number of lacking contents Fn regarding the recommended contents n.

In step S910, determination is made regarding whether the variable n has reached the maximum value or higher. In the event that a negative determination result is obtained here, this means that there are recommended contents remaining regarding which the number of lacking contents has not yet been obtained. In this case, the variable n is incremented in step S911 and the flow returns to step S902.

Accordingly, the number of lacking contents is obtained for each of the recommended contents 1 through n. Upon the number of lacking contents having been obtained for all of the recommended contents 1 through n, a positive determination result is obtained in step S910, and the flow advances to step S912.

Upon reaching step S912, the number of lacking contents F1 through Fn for the recommended contents 1 through n have already been obtained. Accordingly, in step S912, a recommendation order is set among the recommended contents 1 through n, based on the number of lacking contents F1 through Fn. Various ideas can be conceived regarding how to set the recommendation order using number of the lacking contents F1 through Fn, so description of specific examples will be omitted here. As a basic rule, subsidiary contents with fewer lacking contents are set with a higher recommendation order.

Note that with the processing in step S903, description has been made that the recommendation order is to be set based simply on the number of lacking contents, but an arrangement may be conceived wherein the percentage or ratio of lacking contents in the primary contents used as the source editing material in the subsidiary contents is set as the recommendation order. That is to say, regarding the recommendation order being set based on the usage state of the held primary contents as source editing material, specific algorithms thereof are not restricted to that in FIG. 25.

Returning to FIG. 22, if we say that the recommendation order according to FIG. 25 has been set as step S808 for example, the recommended content related processing unit 121 recreates the recommended content list so a to reflect the setting results of the recommendation order in the same step S808. As for this processing, one conceivable idea is to re-sort the array order of subsidiary contents set in the recommended content list so far, in accordance with the recommendation order. Another idea that can be conceived is to newly embed data indicating the recommendation order in metadata for each subsidiary content in the recommended content list.

In step S809, the recommended content related processing unit 121 returns the recommended content list recreated to the content reflecting the recommendation order, to the communication tool 102 as a response to the recommendation order setting request.

The communication tool 102 uses the recommended content list received in step S809 above and executes processing for display output (presenting) of an image presenting the recommended contents according to a predetermined format, as the processing of step S810. At this time, the recommended contents are presented such that the set recommendation order is reflected.

Note that while the recommendation order is described as being set at the user terminal device 4 side in FIG. 22 for example, an arrangement can be conceived where such processing is also performed at the server (subsidiary content server 2) side. According to this configuration, a recommended content list in which the recommendation order has been reflected can be created at the server side.

However, attempting to set the recommendation order at the server side as well, for example, obtaining the number of lacking contents means that information indicating the breakdown of the held primary contents for each user (held primary content information) to be stored at the server side has to be had. Alternatively, the information indicating the breakdown of the held primary contents has to be transmitted from the user terminal device 4 each time recommendation order setting is to be performed at the server side.

With consideration to reality, in the case of the former, held primary content information for each of a great number of users will be stored and managed at the server side, so the processing at the serve side may become slow. Also, in the case of the later, the held primary content information is exchanged over the network each time a recommended content list has to be created, but it is conceivable that there is a considerable number of users who hold primary contents in the thousands or tens of thousands. The size of held primary content information for such users will be considerable, which would lend to traffic congestion. Also, in either case, the breakdown of held primary contents is known to the server side (i.e., a third party), and some users most likely will dislike this.

Conversely, with the case of the present embodiment, all that has to be done at the subsidiary content server 2 side is to extract recommended contents based on the content ID of the primary content currently being played, and create a recommended content list, with the recommendation order setting being performed locally, i.e., at the user terminal device 4 side.

Accordingly, no held primary content information has to be held at the server side, so the processing load of the server side is alleviated, and traffic congestion is irrelevant. Also, the breakdown of the held primary contents is not comprehended at the server side.

Opposite to the case in FIG. 22, a configuration can be conceived wherein, for example, the content IDs for all held primary contents are transmitted from the user terminal device 4 side, with the subsidiary content server 2 creating a recommended content list from subsidiary contents extracted with regard to all held primary contents.

However, in this case, it can be conceived that the number of subsidiary contents to be presented as recommended contents will be very great. Also, it is unlikely that the user is equally fond of all held primary contents, so there is a higher possibility that subsidiary contents which actually have no value of recommendation are extracted as recommended contents as well.

Also, the processing for extracting recommended contents corresponding to all held primary contents also will be very slow processing, particularly in the event that the total of held primary contents is very great.

Accordingly, with the present embodiment, the above-described trouble is avoided by restricting the key for extracting the recommended contents to the one primary content being played at the user terminal device 4, as shown in FIG. 22.

Thus, with the present embodiment, it can be said that a configuration has been made wherein operations relating to content recommendation can be obtained as efficiently as possible, taking into realistic situations such as the processing capability of current computer systems, the trend of users regarding privacy, and so forth.

Also, the recommendation order can be set based on conditions other than the number of lacking contents for example, or may be set based on the number of lacking contents and one or more other conditions.

While conditions other than the number of lacking contents are not restricted in particular, a conceivable arrangement is to use a playing history or rating (favorite rating) of the recommendation-receiving user regarding the held primary contents included in the source editing material of the recommended contents.

The reason is that using information such as playing history or the ratings or the like allows how fond the user is of that content to be numerically quantified. It can be said that the more the user is fond of a certain held primary content, the greater the value for recommendation is for recommended contents including that held primary content as the source editing material.

Also, in a case of setting the recommendation order by such multiple conditions, recommendation order settings based on certain particular conditions may be performed at the subsidiary content server 2 side. That is to say, the recommendation order settings can be dispersed between the user terminal device 4 side and the server side. In this case, the recommendation orders set for each condition can be integrated at the user terminal device 4 for example, so as to obtain a final recommendation order.

In the processing for subsidiary content recommendation shown in FIG. 22 above, the content ID of the primary content being played (key primary content) is transmitted from the user terminal device 4 side to the subsidiary content server 2 as a key for extracting recommended contents. In response to this, a recommended content list made up of a metadata group of recommended contents is returned from the subsidiary content server 2 to the user terminal device 4.

The content ID is an identifier for identifying a content, and in light of this, the content ID can be said to be a type of metadata regarding the content, in a broad sense of the term. Thus, we can say that with the processing shown in FIG. 22, in response to a content ID which is metadata being handed to the subsidiary content server 2, data of the recommended content list which is also metadata, is returned. That is to say, with the processing in FIG. 22, no actual content data is exchanged between the user terminal device 4 and the subsidiary content server 2, and this can be viewed as exchanging only metadata.

Accordingly, next, an example of subsidiary content recommendation aggressively employing exchange of metadata will be described as a modification. For example, with the configuration for subsidiary content recommendation described earlier with FIG. 22, a system configuration has been described wherein recommended contents are extracted with the identification information, i.e., content ID, identifying what the primary content being played at the user terminal device 4 side (player unit 120) is, as a key.

Conversely, with the present modification, the key for extracting recommended contents is metadata of the content being played at the user terminal device 4 side (player unit 120). That is to say, the content described in the items defined as metadata (metadata items) is taken as the key.

As one specific example, if we say that there is a metadata item defined as "artist (creator) name", and a content of "Tokkyo Taro" is described in this metadata item, this "Tokkyo Taro" can be taken as the key. Note that "metadata" in this modification is metadata in the narrow sense of the term, as compared with the content ID serving as the key above, for example. Also, in this modification, content correlated with the metadata serving as a key may be either primary content or subsidiary content.

Figure 26:
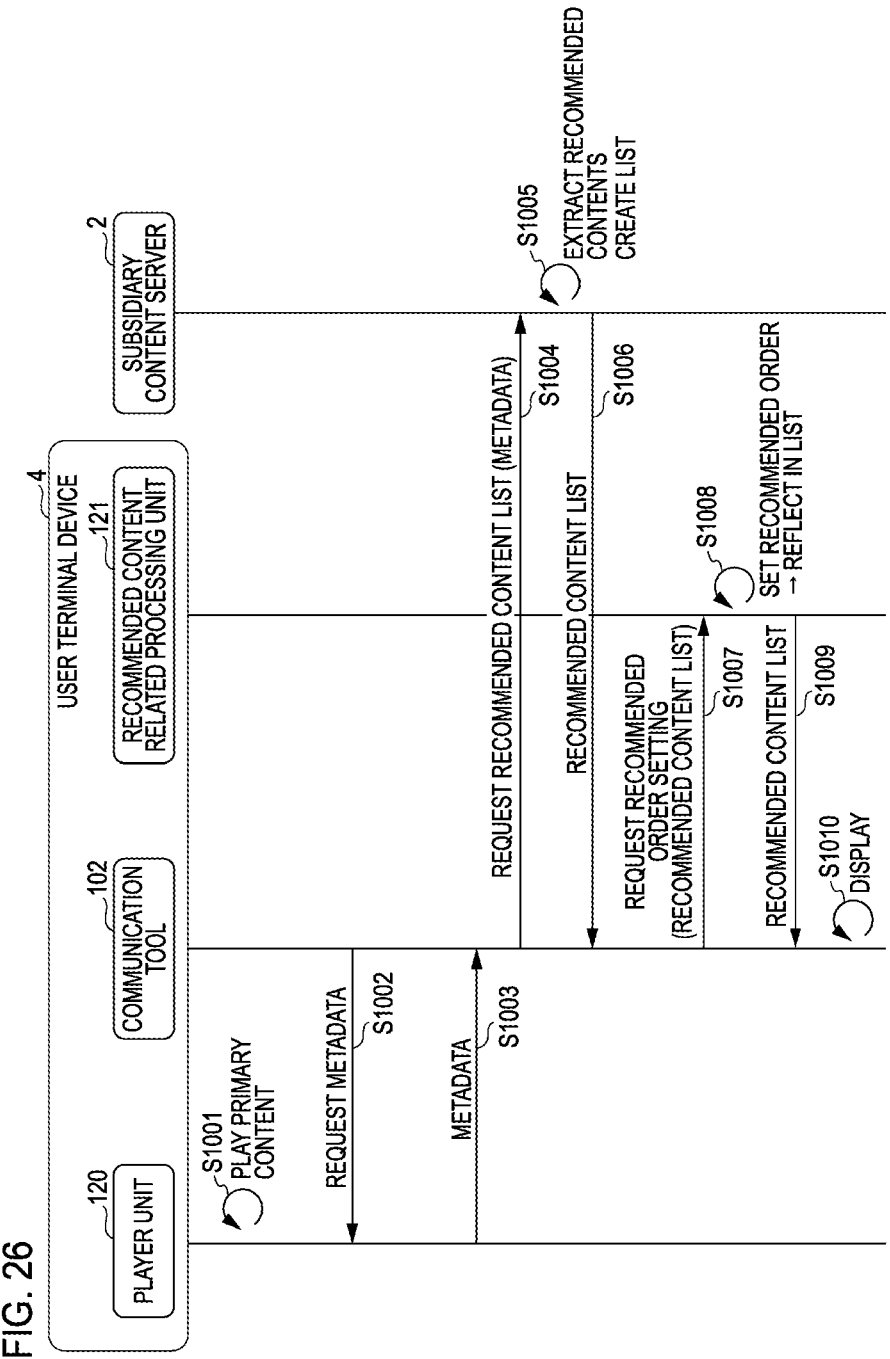
FIG. 26 is a sequence diagram illustrating an example of processing performed with the content creating/sharing system in relation to recommendation of subsidiary contents, as a modification.

FIG. 26 illustrates processing executed at the content creating/sharing system for recommending subsidiary contents, as a modification. Here as well, the player unit 120 (content managing/creating tool 101) at the user terminal device 4, the communication tool 102, recommended content related processing unit 121 (content managing/creating tool 101), and subsidiary content server 2 are shown as primary entities executing processing here.

Note that in this description below, primary contents which the user holds are referred to as held primary contents in the same way as above, and subsidiary contents which the user holds will be referred to as held subsidiary contents. Also, in the event that there is no particular distinguishing between held primary contents and held subsidiary contents, this will be referred to as held contents.

Also, in order to simplify and facilitate understanding of the prerequisites, we will say that the structure of the header information of a primary content file is the same as that of a subsidiary content file, such as shown in FIG. 13, FIG. 14, and so on.

First, here, we will say that in step S1001, processing is being executed for playing and outputting a content from the player unit 120. The content being played and output here may be either a primary content or a subsidiary content.

In the following step S1002, the communication tool 102 requests the player unit 120 for data of one or more metadata items specified from the metadata items added to the content which is currently being played.

Now, an example of a trigger for starting the processing in step S1002 may include a case wherein an operations is made as to the GUI of the communication tool 102 to instruct providing of recommended contents related to the content currently being played by the player unit 120. Also, a metadata item to be specified at the time of a metadata request in step S1002 as well, may be specified in accordance with user operations. For example, if we say that "creator name" has been specified by the user as the metadata item to be requested, a request is made in step S1002 specifying the metadata item of "creator name".

The player unit 120 which has received the metadata request returns the metadata requested in step S1003, that is to say, the content described in the metadata item specified with the metadata request is returned.

Now, at the time of the player unit 120 obtaining the content described in the metadata item, data stored in the specified metadata item can be read out from the metadata items in the header information of the content currently being played.

For example, if we say that the metadata item "creator name" has been specified by the metadata request, the player unit 120 reads out and obtains the data described in the metadata item for creator name, in the header information of the content currently being played. The player unit 120 then hands the data of the metadata item obtained as described above, to the communication tool 102.

Note that with regard to step S1002, a configuration can be made wherein a metadata request can be issued specifying two or more metadata items in accordance with user specifying operations, for example. In this case, in step S1003, the data of the content of each of the multiple specified metadata items will be returned.

Upon receiving the metadata in step S1003, the communication tool 102 transmits a recommended content list request to the subsidiary content server 2 in step S1004. For this recommended content list request, the metadata received in step S1003 (data described in the specified metadata item) is stored in the operand thereof, for example. This metadata is used as the key of later-described content extracting (extracting conditions/searching conditions).

Note that in the event that multiple metadata are received in step S1003, these metadata can be transmitted along with a conditional expression for extraction (searching) at the time of the recommended content list request in step S1004. The conditional expression can also be specified by user operations at the time of specifying the metadata items in step S1002, for example.

The recommended content processing unit 25 of the subsidiary content server 2 which has received the recommended content list request in step S1004 executes extracting of the recommended contents and creating of a recommended content list based on the results of extracting, in step S1005.

First, the extracting of the recommended contents in this case is performed with the metadata received along with the recommended content list request in step S1004 as the key (extracting conditions/searching conditions).

For example, let us say that what is in the obtained metadata is "Tokkyo Taro" which is one of the creator names. In this case, the recommended content processing unit 25 searches for subsidiary contents to which "Tokkyo Taro" is added as metadata from the subsidiary content database 22a.

With the present embodiment, the metadata to be added to the content is stored in the header information, so the recommended content processing unit 25 in this case searches for subsidiary contents having the text string of "Tokkyo Taro" in the header information as data.

While an arrangement may be made wherein only the metadata item of "creator name" in the header information is searched at the time of searching with the data "Tokkyo Taro" as the key for example, an arrangement may be made wherein the entire header information, i.e., the entire metadata added to the subsidiary content may be searched. In the case of the latter search, in a case that the text string of "Tokkyo Taro" is used in the content title for example, or a metadata item such as creator comments, such subsidiary contents are also extracted, leading to a greater possibility that the search results will satisfy the user's expectations.

Also, as described earlier, in the event that multiple metadata are received as the key, the recommended content processing unit 25 performs a search for subsidiary contents following conditional expressions set regarding these metadata.

Upon searching and extracting of the subsidiary contents as the recommended contents having ended, the recommended content processing unit 25 creates a recommended content list in the same step S1005.

Now a recommended content list created here is made up of metadata (e.g., header information) for each of n extracted recommended contents 1 through n, in the same way as with FIG. 22 for example, and the structure may be the same as that in FIG. 24. Also, note that with this modification as well, no recommendation order has been set among the registered subsidiary contents in the recommended content list.

The recommended content processing unit 25 returns the recommended content list created as described above to the user terminal device 4 in step S1006. At the user terminal device 4, the communication tool 102 receives the recommended content list.

In this modification as well, no recommendation order has been set in the recommended content list which the communication tool 102 has received in step S1006. Accordingly, in order to set a recommendation order, the communication tool 102 hands the data of the recommended content list to the recommended content related processing unit 121 in step S1007, and also makes a recommendation order setting request.

At the recommended content related processing unit 121, a recommendation order is set in step S1008 in response to the recommendation order setting request, and processing for reflecting the set recommendation order in the recommended content list is performed.

In step S808 in FIG. 22, a recommendation order was set based on the number of lacking contents for each recommended content, but setting of the recommendation order in step S1008 is based on the relation between statistics of metadata of the held contents managed at the user terminal device 4, and the metadata for each recommended content, which will be described next.

Figure 27:
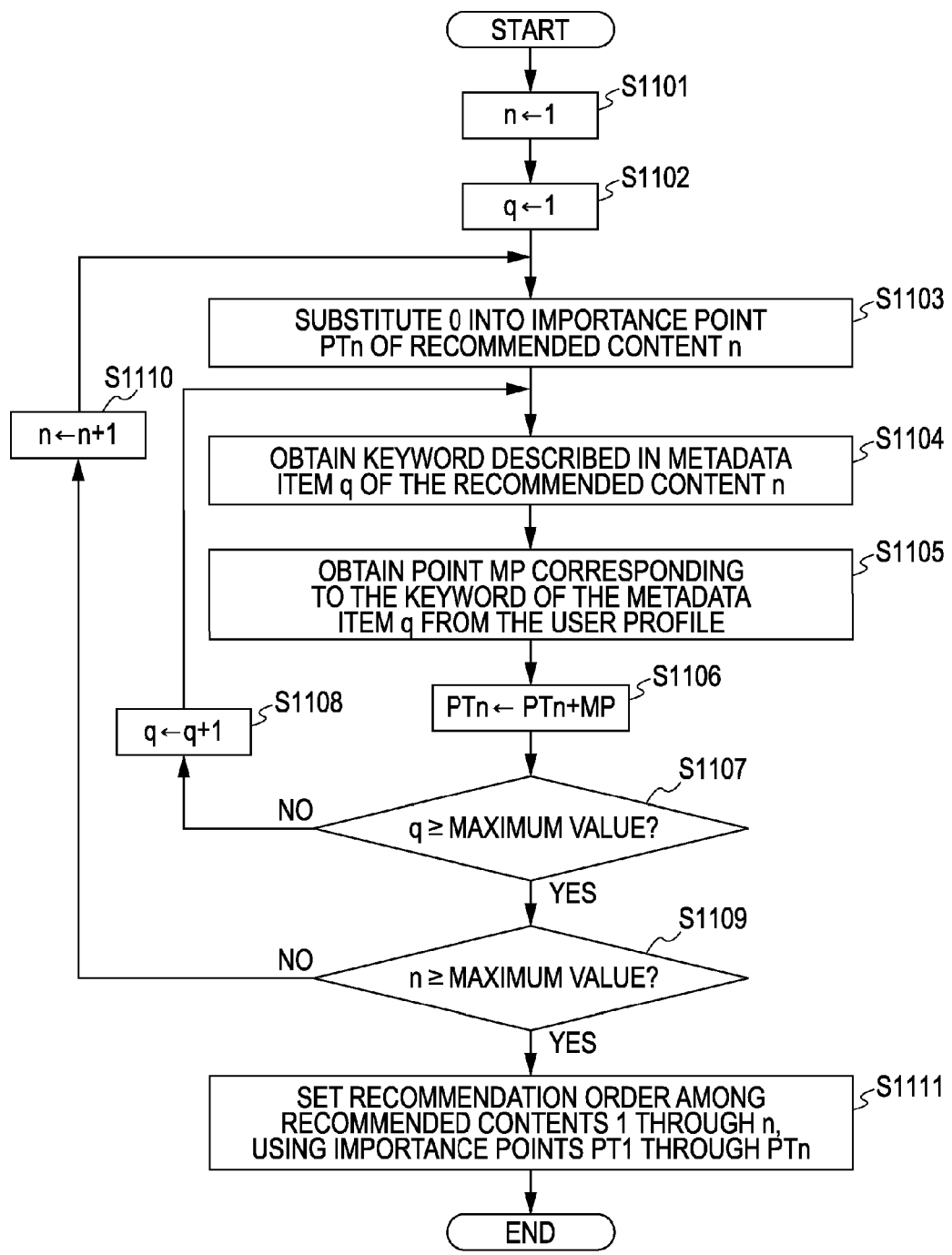
FIG. 27 is a flowchart illustrating an example of processing procedures for setting the recommendation order in FIG. 26.

The flowchart in FIG. 27 shows an example of processing procedures for setting recommendation order in step S1008.

First, in step S1101 the recommended content related processing unit 121 performs initialization by substituting 1 into the variable n corresponding to the No. given to the recommended contents included in the recommended content list.

Also, in step S1102, initialization is performed by substituting 1 into the variable q corresponding to the No. given to the metadata item corresponding to the recommended contents n. As shown in FIG. 24, the recommended content list is made up of an array of metadata made up of header information for each of the recommended contents. Also, the header information which is metadata for each of the recommended contents is made up of multiple metadata items corresponding to predetermined definition content. The variable q corresponds to the Nos. given to these metadata items for convenience.

In step S1103, the recommended content related processing unit 121 substitutes 0 in the value of the variable PTn serving as an importance point, as initialization processing for obtaining a value as a importance point PTn, i.e., a score indicating importance, corresponding to each recommended content n.

In step S1104, the recommended content related processing unit 121 reads in the q'th metadata item (metadata item q) from the metadata (header information) corresponding to the n'th recommended content (recommended content n) in the recommended content list, and obtains the content (data) described here. Note that what is described in the metadata item will be referred to as "keyword (metadata description content)" here. For example, while "creator", "title", "genre", and so forth can be given as metadata items as shown exemplarily in FIG. 14, what is described in each of the metadata items such as "Tokkyo Taro", "Tokkyo no Kimochi", "Ethnic", and so forth, are keywords.

Now, the recommended content related processing unit 121 creates and manages keyword statistical information having a structure shown in FIG. 28, for example.

The keyword statistical information is statistics gathered on the content of description serving as keywords of metadata regarding held contents which the user (recommendation-receiving user) of the user terminal device 4 (content creating/sharing application 100) shown in FIG. 26 has, and the number of times of occurrence thereof.

That is to say, all keywords extracted from the metadata group (header information) for each held content (here, keyword 1, keyword 2, . . . keyword X) are stored in the keyword space of the keyword statistical information, and values based on the number of times of occurrence in the entire held contents are correlated as points for each of the keywords. Note that the way of obtaining points here is not restricted in particular as long as it is based on the number of times of occurrence. Also, the number of times of occurrence may be used itself as points.

With regard to keywords with high points in the keyword statistical information, user interest can be said to high, since the number of times of occurrence is that high. Specifically, if there is a keyword "Tokkyo Taro" in the keyword statistical information, and the points correlated to this keyword are considerably high, we can estimate that the user has great interest in contents relating to "Tokkyo Taro".

Thus, the keyword statistical information can be said to be information representing tastes of the individual user with regard to contents, from the perspective of keywords in the metadata.

In step S1105, the recommended content related processing unit 121 searches for a keyword matching the keyword of the data item q obtained in step S1104 from the keyword statistical information. If there is a matching keyword here, the value of the point correlated with this keyword is set as point MP. That is to say, the value for the points correlated with the keyword is substituted into the variable MP. Note that if there is no matching keywords, 0 is set for the point MP.

In step S1106, with regard to the importance points PTn of the recommended content n, the recommended content related processing unit 121 adds the points MP obtained in step S1105 above to the importance points PTn so far, and updates.

In step S1107, the recommended content related processing unit 121 determines whether or not the variable q has reached the maximum value or higher. In the event that a negative determination result is obtained here, this means that there are remaining metadata items regarding which keywords have not yet been obtained, so the variable q is incremented in step S1108 and the flow returns to step S1104.

In the event that the recommended content related processing unit 121 has performed the procedures for steps S1104 through S1106 for all of the metadata items 1 through q, a positive determination result is obtained in step S1107, and the flow proceeds to step S1109.

In step S1109, the recommended content related processing unit 121 determines whether or not the variable n has reached the maximum value or higher. In the event that a negative determination result is obtained here, this means that there are remaining recommended contents regarding which importance points have not yet been obtained, so the variable n is incremented in step S1110 and the flow returns to step S1103. That is to say, the flow transitions to processing for obtaining the importance points PT regarding the next recommended content n.

Upon importance points PT having been obtained regarding all recommended contents 1 through n, a positive determination result is obtained in step S1109, and the flow proceeds to step S1111.

With the description so far, the processing up to step S1110 can be said to be processing for obtaining importance points PT1 through PTn for each recommended content 1 through n.

Also, the importance points for each recommended content can be said to higher in value the more keywords included in the metadata of the recommended content are registered in the keyword statistical information. Moreover, the more matches with high-point, i.e., high-scoring keywords of those registered in the keyword statistical information, the higher the importance points are.

Accordingly, with regard to the recommended contents, we can say that the higher the importance points are, the higher the interest of the user, matching the tastes thereof. In other words, the higher the importance points of the recommended content, the higher the value of recommendation to the user is, i.e., the higher the recommendation order should be set.

Accordingly, in step S1111, the recommendation order regarding the recommended contents 1 through n is set based on the importance points PT1 through PTn obtained so far. That is to say, the most simple way of setting is to assign the recommendation order from the higher in importance points to the lower, from the first to the n'th in order.

Returning to FIG. 26, in step S1008, upon the recommendation order having been set by FIG. 27 above, the recommended content related processing unit 121 recreates the recommended content list so as to reflect the setting results of the recommendation order in the same step S1008.

Next, in step S1009, the recommended content related processing unit 121 returns the recommended content list recreated so as to reflect the recommendation order as described above, to the communication tool 102 in step S1009.

The communication tool 102 uses the recommended content list received in step S1009 above and executes processing for display output of an image presenting the recommended contents according to a predetermined format, in step S1010.

Note that a wide range of metadata items may be considered other than the metadata items of the header information in FIGS. 13 and 14.

For example, in the case of a content which is a tune, this may be the feeling of the melody (data corresponding to "happy", "sad", etc., as keywords), or a situation suitable for listening to the content (data indicating a car drive, the ocean, etc., as keywords), and so on.

Also, in the event that the content is a tune, an arrangement may be conceived wherein a beat is obtained as the feature amount of the tune, by detecting the BPM (Beat Per Minute) or the like for example, and is used as a metadata item.

Also, such metadata does not have to be stored in the header information of the content file, and with the case of the present embodiment for example, may be independently by the content creating/sharing application 100 in a format correlated with the held contents.

Also, the greater the variety of definitions of metadata items is, the more likely it is overall that there will be keywords described with closer significance. For example with regard to metadata items which can express the feeling of a melody, we can say that keywords "sad" and "melancholy" are similar. Also, we can say that "happy" and "up tempo" are similar.

To handle such a situation, a configuration may be made wherein similar keywords under a set standard are integrated into a single keyword, upon which processing is executed for recommending subsidiary contents with the modification shown in FIG. 26, for example.

In this case, keywords with similar significance will be integrated with regard to the metadata exchanged in steps S1003, S1004, and so forth, or keyword statistical information, and so forth. Accordingly, increase in keywords with similar significance can be handled, and accurate extracting of recommended contents and setting of recommendation order can be performed.

Note that with the configuration of subsidiary content recommendation described with FIGS. 22 and 26 above, both are configurations where a content being played by the player unit 120 serves as the starting point and subsidiary contents related thereto are recommended. With this configuration, recommended contents extracted relating to the content being played are automatically presented on a GUI during the user enjoying playing of contents, which is easy to use for the user, and is highly entertaining and handy in that not only can the played contents be enjoyed but information of recommended contents can also be obtained.

Also, with regard to the subsidiary content server 2 and user terminal device 4, each can perform the processing of extracting recommended contents relating to only the one content being played, and setting the recommendation order, for example. Accordingly, the processing load at the subsidiary content server 2 and user terminal device 4 is alleviated in this way as well, and is efficient.

However, an arrangement may be conceived wherein an operation can be made from the user of the content creating/sharing application 100 for example, to directly specify the content to serve as the starting point for subsidiary content recommendation, for example. With this configuration, the content ID (case of FIG. 22) or metadata (case of FIG. 26) of the content specified by this operation is transmitted to the subsidiary content server 2 along with a recommended content list request.

With such a configuration, the user does not have to play the content to serve as the starting point when desiring to obtain information of recommended contents. There may be cases wherein playing a content to obtain the recommended content information may be troublesome for the user, and the above configuration will be useful in such cases.

Also, the modification described with FIGS. 26 through 28 can be extended and applied to primary contents as well. FIG. 29 shows the processing executed at the content creating/sharing system for recommending the primary contents. As with the case of FIG. 26, the player unit 120 (content managing/creating tool 101) at the user terminal device 4, the communication tool 102, and the recommended content related processing unit 121 (content managing/creating tool 101), are shown as primary entities executing processing here. However, the primary content server 1 is shown instead of the subsidiary content server 2.

In FIG. 29, steps S1201 through S1203 are the same as steps S1001 through S1003 in FIG. 26.

Next, upon receiving the metadata in step S1203, the communication tool 102 transmits a recommended content list request to the primary content server 1 in step S1204 along with the metadata obtained in step S1203 above.

The primary content server 1 which has received the recommended content list request in step S1204 performs extracting of recommended contents, and creating of a recommended content list based on the extraction results, in step S1205. Extracting of the recommended contents in this case is performed by searching for primary contents from the primary content database 12a with the metadata received and obtained in step S1204 along with the recommended content list request as a key (extracting conditions/searching conditions).

Upon the searching and extracting of subsidiary contents as recommended contents being completed, the primary content server 1 creates a recommended content list.

The recommended content list created in step S1205 can be formed of metadata (e.g., header information) for each primary content serving as the extracted recommended contents, as with the earlier embodiments.

The primary content server 1 then returns the recommended content list created as described above to the user terminal device 4 in step S1206. In this case as well, at the user terminal device 4, the communication tool 102 can receive the recommended content list.

In this case as well, no recommendation order has been set in the recommended content list received by the communication tool 102 in step S1206. Accordingly, the communication tool 102 hands the data of the recommended content list to the recommended content related processing unit 121 in step S1207, and performs a recommendation order setting request.

The recommended content related processing unit 121 sets a recommendation order in step S1208, and performs processing to reflect the set recommendation order in the recommended content list, in response to the recommended content recommendation order setting request.

The recommendation order setting processing in step S1208 can following the algorithm described with FIG. 27, for example. In step S1209, the recommended content related processing unit 121 returns the recommended content list which has been recreated reflecting the recommendation order to the communication tool 102.

In step S1210, the communication tool 102 uses the recommended content list handed thereto in step S1209 and executes processing for display output of an image presenting the recommended contents according to a predetermined format.

In the case of combining the configuration in FIG. 29 above and the configuration in the earlier FIGS. 26 through 28, recommended contents can be obtained regarding the primary contents and subsidiary contents with the same technique.

Note that the configuration of the primary content server 1, subsidiary content server 2, communication server 3, and user terminal device 4 are but one example, and may actually be changed as appropriate. Also, a configuration may be made wherein at least one of the above three servers is dispersed among multiple servers. Alternatively, a configuration may be made where at least two or more of these servers are integrated.

Also, while no specific example of a GUI screen or the like has been shown for the content creating/sharing application 100 has been described so forth, various GUI configurations can be conceived for the content creating/sharing application 100.

Also, the functional configuration of the content creating/sharing application 100 also is not restricted to that described with reference to FIGS. 10 and 11, and so forth, and various configurations can be conceived.

Also, the structure of the subsidiary content files shown in FIGS. 12A through 16, and so forth, is only an example, and a conceptual one, so various modifications and developments therefrom may be made based thereupon.

Also, the processing procedures shown in the flowcharts in the respective drawings, i.e., program configurations, are only examples, and may be changed as appropriate in actual practice.

Also, the programs executed by the primary content server 1, subsidiary content server 2, communication server 3, and user terminal device 4, may be written to and stored in a storage region such as an internal HDD, storage unit, or the like, as described above, or may be stored in a removable storage medium and installed (including updates) from the storage medium to the storage region. Also, an arrangement may be conceived wherein programs can be installed under the control of other host devices via a predetermined data interface. Further, an arrangement may be conceived wherein programs are stored on a storage device on the network, and can be downloaded and obtained from the storage device by the networking functions of the primary content server 1, subsidiary content server 2, communication server 3, and user terminal device 4.

The present application contains subject matter related to that disclosed in Japanese Priority Patent Application JP 2008-146013 filed in the Japan Patent Office on Jun. 3, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:

a server device configured to store and manage at least one piece of subsidiary content, each piece of subsidiary content having been generated by an editing process that uses at least one piece of primary content as source editing material, wherein a piece of subsidiary content includes playback control information including instructions for playback of the at least one piece of primary content that was source editing material for the piece of subsidiary content, the server device comprising at least one processor configured to:

identify one or more pieces of subsidiary content based at least in part on a received content identifier identifying a selected piece of primary content; and transmit metadata corresponding to each of the identified pieces of subsidiary content to a terminal device as recommended contents; and a terminal device configured to execute playback processing for a piece of subsidiary content by playing back at least one piece of held primary content, the at least one piece of held primary content being primary content the terminal device holds, the terminal device comprising at least one processor configured to:

transmit a recommended content information request to said server device, the recommended content information request including a content identifier identifying the at least one piece of held primary content for which playback processing is being executed by said terminal device;

receive metadata corresponding to at least one piece of recommended subsidiary content from the server;

determine a recommendation order of the at least one piece of recommended subsidiary content based at least in part on, for each piece of recommended subsidiary content, the number of pieces of primary content that the user of the terminal device holds that were used as source editing material in generating the piece of recommended subsidiary content; and present the at least one recommended piece of subsidiary content to the user according to the recommendation order.

2. The information processing system of claim 1, wherein the recommendation order of the at least one piece of recommended subsidiary content is such that pieces of recommended subsidiary content with fewer lacking pieces of primary content appear higher within the recommendation order.

* * * * *